United States Patent [19]
Haselden, Jr. et al.

[11] Patent Number: 6,155,293
[45] Date of Patent: Dec. 5, 2000

[54] DOUBLE VALVE WITH ANTI-TIEDOWN CAPABILITY

[75] Inventors: David W. Haselden, Jr., Lavonia, Ga.; Neil E. Russell, Bloomfield Hills, Mich.; Logan H. Mathis; C. Brian Wolfe, both of Lavonia, Ga.

[73] Assignee: Ross Operating Valve Company, Troy, Mich.

[21] Appl. No.: 09/330,937

[22] Filed: Jun. 11, 1999

Related U.S. Application Data

[63] Continuation-in-part of application No. 08/770,878, Dec. 20, 1996, Pat. No. 5,927,324.
[60] Provisional application No. 60/033,016, Dec. 16, 1996.

[51] Int. Cl.⁷ .......................... F15B 13/043; F15B 20/00
[52] U.S. Cl. ........................................ 137/596.16; 91/424
[58] Field of Search .......................... 91/424; 137/596.16

[56] References Cited

U.S. PATENT DOCUMENTS

| | | |
|---|---|---|
| Re. 30,403 | 9/1980 | Bitonti . |
| Re. 31,161 | 3/1983 | Mahorney . |
| 1,290,865 | 1/1919 | Anthony . |
| 2,051,732 | 8/1936 | McKee . |
| 2,593,564 | 4/1952 | Ives . |
| 2,954,009 | 9/1960 | Jullfs . |
| 2,995,141 | 8/1961 | Hipp . |
| 3,280,951 | 10/1966 | Jordan . |
| 3,371,759 | 3/1968 | Sapolsky . |
| 3,670,767 | 6/1972 | Mahorney . |
| 3,757,818 | 9/1973 | Sweet . |
| 3,834,621 | 9/1974 | Pacht et al. . |
| 3,858,606 | 1/1975 | Cameron . |
| 4,075,928 | 2/1978 | Bitonti . |
| 4,181,148 | 1/1980 | Russell et al. . |
| 4,257,455 | 3/1981 | Cameron . |
| 4,345,620 | 8/1982 | Ruscher et al. . |
| 4,353,392 | 10/1982 | Ruscher et al. . |
| 4,542,767 | 9/1985 | Thornton et al. . |
| 5,113,907 | 5/1992 | Russell . |
| 5,850,852 | 12/1998 | Russell et al. .............. 137/596.16 |
| 5,906,246 | 5/1999 | DiTirro et al. . |

FOREIGN PATENT DOCUMENTS

| | | |
|---|---|---|
| 1099294 | 8/1961 | Germany . |
| 38890 | 8/1965 | Germany . |
| 41174 | 11/1965 | Germany . |
| 1 249 040 | 8/1967 | Germany . |
| 2750895 A1 | 5/1979 | Germany . |
| 3032336 A1 | 3/1981 | Germany . |
| 86 12453 | 6/1986 | Germany . |
| 90 14 789 | 7/1991 | Germany . |
| 1294747 | 11/1972 | United Kingdom . |
| 2010448 | 6/1979 | United Kingdom . |
| 2057638 | 4/1981 | United Kingdom . |

*Primary Examiner*—Gerald A. Michalsky
*Attorney, Agent, or Firm*—Harness, Dickey & Pierce, P.L.C.

[57] ABSTRACT

A control valve system has two valve trains each of which has a series of valves which dynamically move between a deactuated position and an actuated position. An inlet of the valve system is connected to an outlet of the valve system when all of the valves are actuated and the outlet of the valve system is connected to an exhaust when all of the valves are deactuated. Each valve train includes a solenoid valve which when actuated moves the remaining valve members to their actuated position. The various valves of each valve train are interconnected with the valve of the other valve train such that actuation of all of the valves in a substantially simultaneous manner will connect the inlet of the valve system to the outlet of the valve system and deactuation of all of the valves in a substantially simultaneous manner will connect the outlet to the exhaust. The valve system monitors the dynamic movement of the valve members during its operation will move to a locked out condition when any valve is in a deactuated position and when one other valve is in an actuated position. In the locked out condition, the outlet of the valve system is corrected to the exhaust. The valve system will remain in this locker out condition until a resetting operation is performed. During a reset operation, the valve system can not actuate one of the valve trains because one of the valve trains is depressurized during the reset operation.

16 Claims, 20 Drawing Sheets

DOUBLE VALVE WITH ANTI-TIEDOWN CAPABILITY

This is a continuation-in-part of application Ser. No. 08/770,878, filed Dec. 20, 1996, now U.S. Pat. No. 5,927,324, which claims the benefit of U.S. Provisional Application No. 60/033,016, filed Dec. 16, 1996.

FIELD OF THE INVENTION

The present invention relates to a control valve. More particularly, the present invention relates to a dual poppet fluid control valve which includes an anti-tiedown device that prevents the control valve from operating if the control valve reset has been tied down.

BACKGROUND AND SUMMARY OF THE INVENTION

Machine tools of various types operate through a valving system which interacts with a pneumatic controlled clutch and/or brake assembly. For safety reasons, the control valves which are used to operate these machine tools require the operator to actuate two separate control signal applying contacts essentially simultaneously. This requirement of simultaneous application ensures that the operator will not have his hand near the moving components of the machine tool when an operating cycle is initiated. The two control signal applying contacts can then be connected to the valving system which allows compressed air to be delivered to the machine tool to perform its operating cycle.

Safety rules and regulations require the valving system to be designed such that if a component in the valving system malfunctions, the valving system will not allow additional movement of the machine tool. In addition, the valving system must ensure that a new operation cycle of the machine tool cannot be initiated after a component of the valving system has become defective.

Prior art electromagnetic valving systems which are utilized for the operation of machine tools meet these safety requirements through the use of a double valve assembly. The double valve assembly, includes two electromagnetic supply valves which are normally closed. Each of the supply valves is moved to an open position in response to an electrical control signal. The two supply valves are arranged in series with respect to the source of compressed air. The double valve assembly also includes two exhaust valves which are normally open. Each exhaust valve is closed by a respective supply valve when it is opened. It is therefore necessary for the supply valves to be opened simultaneously otherwise, supply air will be exhausted from the system through one of the exhaust valves. The opening and closing of the valve units is monitored by sensing air pressures in the respective valve units and then comparing these two pressures. The monitoring and comparing of these two pressures is accomplished by using a single air cylinder which is separated into two chambers by a piston. The pressure in each valve unit is delivered to one of the chambers. Thus, unequal pressures in the valve units will cause movement of the normally static piston which will then interrupt the electrical signal to one of the valve units. This and other external electronic monitoring arrangements are expensive and require that electrical signal processing equipment be designed and utilized.

The continued development of the valving systems for machine tools has been directed toward more reliable, simpler and less costly valving systems which both meet and exceed the safety performance requirements in force today as well as those proposed for the future.

The present invention provides the art with a control valve system which operates entirely pneumatically thus eliminating the need for electrical monitoring and the associated controls. The control valve system includes a plurality of valves each of which open or close during the actuation or deactuation of the valves. The control valve system monitors the dynamic movement of the various valves of the system to ensure the proper functioning of the control valve system. The control valve system moves to a locked out position upon sensing a malfunction and remains in this locked out position until a resetting operation is performed. Thus, the operation of the control assembly is totally dynamic and the system does not rely on the monitoring of a static member to ensure its proper function.

The above-described invention clearly meets the requirement that valving systems for more reliable, simpler, and less costly valving systems which both meet and exceed the safety performance requirements in force today as well as those proposed for the future. In some such systems, however, operators sometimes attempt to maintain the reset in an operating position in order to attempt to prevent the machine from locking out in response to a malfunction.

The present invention also provides the art with a control valve system which operates entirely prenumatically. The control valve system includes a plurality of valves each of which open or close during the actuation or deactuation of the valves. The control valve system monitors the dynamic movement of the various valves of the system to ensure the proper functioning of the control valve system. The control valve system moves to a locked-out position upon sensing a malfunction and remains in this locked out position until a reset operation is performed. The control valve system also includes anti-tiedown capability which prevents operation of the control valve system to supply an output pressure while the reset operation is performed.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
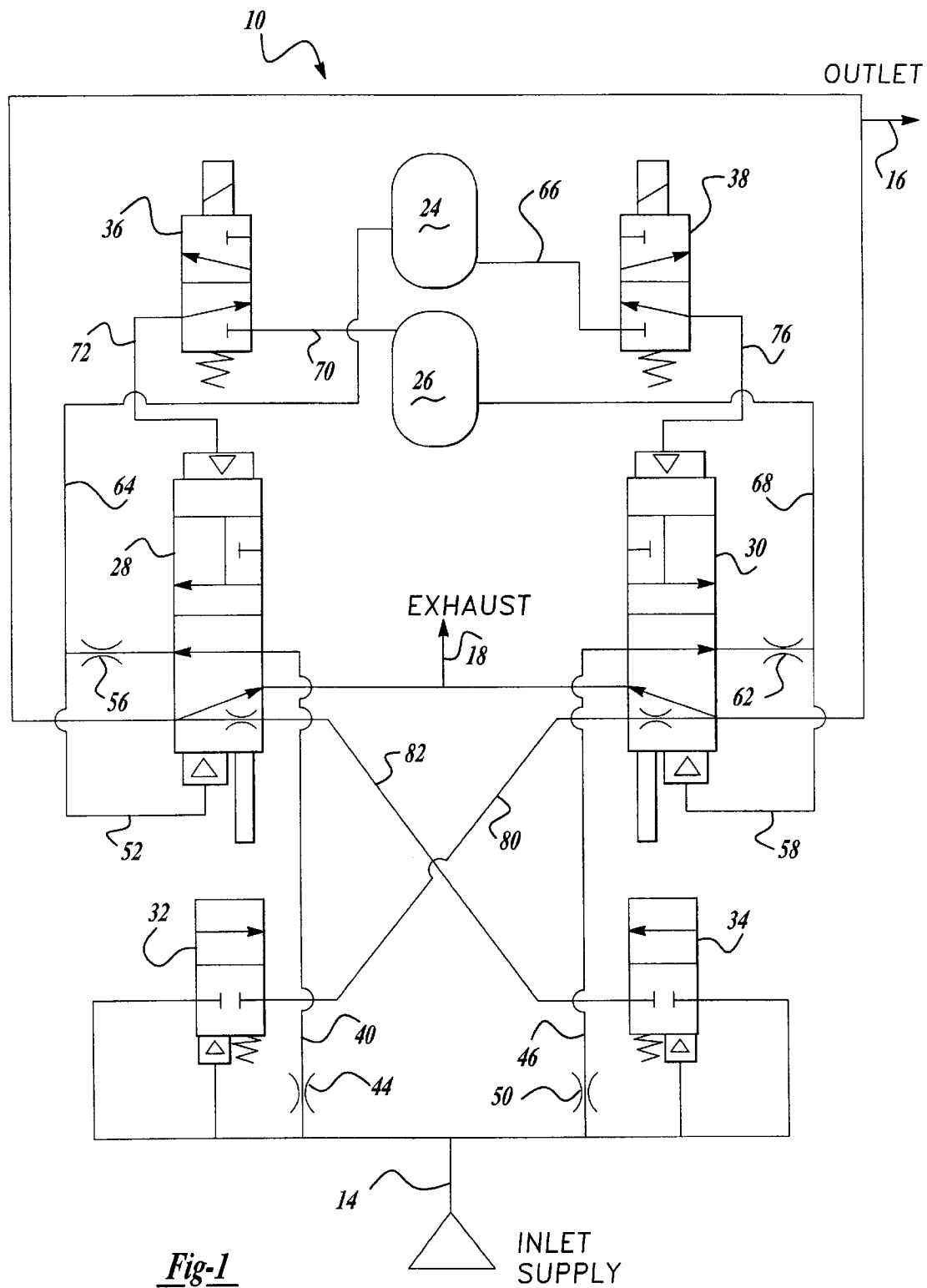
FIG. 1 is a schematic circuit diagram of the control valve system of the present invention shown in a deactuated position.
Figure 2:
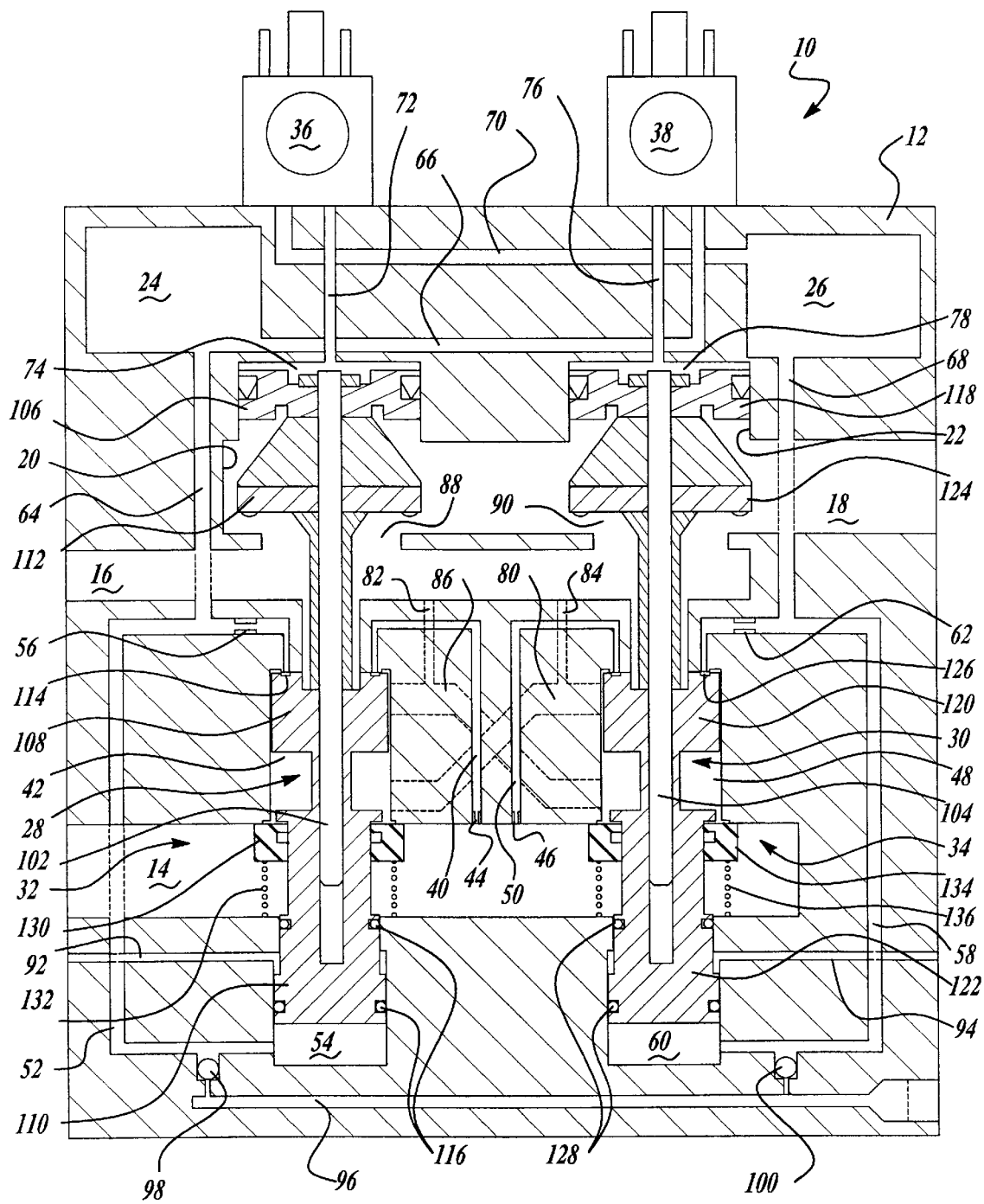
FIG. 2 is a schematic illustration of the control valve shown in its deactuated position.

Referring now to the drawings in which like reference numerals designate like or corresponding parts throughout the several views, there is shown in FIGS. 1 and 2 a control valve system in accordance with the present invention which is designated generally by the reference numeral 10. Control valve system 10 is shown as a schematic fluid circuit in FIG. 1 and as a fluid control valve in FIG. 2.

Referring now to FIG. 2, control valve system 10 comprises a housing 12 having a fluid inlet passage 14, a fluid outlet passage 16, a fluid exhaust passage 18, a first valve bore 20, a second valve bore 22, a first fluid reservoir 24 and a second fluid reservoir 26. Disposed within first valve bore 20 is a first valve member 28 and disposed within second valve bore 22 is a second valve member 30. Located within inlet passage 14 in a coaxial relationship with first valve member 28 is a third valve member 32. Also located within inlet passage 14 in a coaxial relationship with second valve member 30 is a fourth valve member 34. A pair of solenoid valves 36 and 38 are attached to housing 12.

A plurality of fluid passages interconnect valve bores 20 and 22 with inlet 14, outlet 16, exhaust 18, reservoir 24, reservoir 26, valve 36 and valve 38. A fluid passage 40 extends between inlet passage 14 and an intermediate chamber 42 formed by bore 20. A restrictor 44 is disposed within passage 40 to limit the amount of fluid flow through passage 40. A fluid passage 46 extends between inlet passage 14 and an intermediate chamber 48 formed by bore 22. A restrictor 50 is disposed within passage 46 to limit the amount of fluid flow through passage 46.

A fluid passage 52 extends between chamber 42 and a lower chamber 54 formed by bore 20. A restrictor 56 is disposed within passage 52 to limit the amount of fluid flow through passage 52. A fluid passage 58 extends between chamber 48 and a lower chamber 60 formed by bore 22. A restrictor 62 is disposed within passage 58 to limit the amount of fluid flow through passage 58. A fluid passage 64 extends between passage 52 and reservoir 24 such that restrictor 56 is located between chamber 42 and reservoir 24. A fluid passage 66 extends between reservoir 24 and the input to solenoid valve 38. A fluid passage 68 extends between passage 58 and reservoir 26 such that restrictor 62 is located between chamber 48 and reservoir 26. A fluid passage 70 extends between reservoir 26 and the input to solenoid valve 36. A passage 72 extends between the output of solenoid valve 36 and an upper chamber 74 formed by bore 20. A passage 76 extends between the output of solenoid valve 38 and an upper chamber 78 formed by bore 22.

A cross passage 80 extends between the lower portion of chamber 42 and the upper portion of chamber 48. A cross passage 82 extends between the lower portion of chamber 48 and the upper portion of chamber 42. A fluid passage 84 extends between passage 80 and outlet passage 16. A fluid passage 86 extends between passage 82 and outlet passage 16. Outlet passage 16 is in communication with exhaust passage 18 through two ports 88 and 90. The upper portions of chambers 54 and 60 are in communication with atmospheric pressure through passages 92 and 94, respectively. A reset passage 96 extends into housing 12 and is in communication with the lower portion of chambers 54 and 60 by communicating with passages 52 and 58, respectively. A pair of check valves 98 and 100 are disposed between reset passage 96 and passages 52 and 58 respectively, to prohibit fluid flow between passages 52 or 58 to reset passage 96 but allow fluid flow from reset passage 96 to one or both passages 52 and 58.

Disposed within bore 20 is valve body or member 102 and disposed within bore 22 is valve body or member 104. Valve member 102 comprises an upper piston 106, an intermediate piston 108 and a lower piston 110 all of which move together as a single unit. Upper piston 106 is disposed within chamber 74 and includes a valve seat 112 which opens and closes port 88 located between outlet passage 16 and exhaust passage 18. Intermediate piston 108 is disposed within chamber 42 and includes an annular passage 114 which fluidly connects passage 40 to passage 52 when piston 108 is seated against housing 12. Lower piston 110 is located within chamber 54 and includes a pair of seals 116 which seal inlet passage 14 from passage 92 and seal chamber 54 from passage 92. Valve member 104 comprises a upper piston 118, an intermediate piston 120 and a lower piston 122 all of which move together as a single unit. Upper piston 118 is disposed within chamber 78 and includes a valve seat 124 which opens and closes port 90 located between outlet passage 16 and exhaust passage 18. Intermediate piston 120 is disposed within chamber 48 and includes an annular passage 126 which fluidly connects passage 46 to passage 58 when piston 120 is seated against housing 12. Lower piston 122 is located within chamber 60 and includes a pair of seals 128 which seal inlet passage 14 from passage 94 and seal chamber 60 from passage 94.

Valve member 32 is located around lower piston 110 and comprises a valve seat 130 and a valve spring 132. Valve spring 132 biases valve seat 130 against housing 12 to prohibit fluid flow between inlet passage 14 and chamber 42. Valve member 34 is located around piston 122 and comprises a valve seat 134 and a valve spring 136. Valve spring 136 biases valve seat 134 against housing 12 to prohibit fluid flow between inlet passage 14 and chamber 48.

FIGS. 1 and 2 illustrate control valve system 10 in its deactuated position. Pressurized fluid from input passage 14 is biasing valve seats 130 and 134 against housing 12 closing communication between inlet passage 14 and both chambers 42 and 48. Pressurized fluid is provided to passage 40 through restrictor 44, to passage 52 through annular passage 114 through restrictor 56 and into chamber 54 to bias valve member 102 upward as shown in FIG. 2 seating piston 108 against housing 12. Pressurized fluid also flows through passage 52, through passage 64 to reservoir 24 and from reservoir 24 to the inlet of solenoid valve 38 through passage 66. In a similar manner, pressurized fluid from input passage 14 is provided to passage 46 through restrictor 50 to passage 58 through annular passage 126 through restrictor 62 and into chamber 60 to bias valve member 104 upward as shown in FIG. 2 seating piston 120 against housing 12. Pressurized fluid also flows through passage 58, through passage 68 to reservoir 26 and from reservoir 26 to the inlet of solenoid valve 36 through passage 70. Outlet passage 16 is in communication with exhaust passage 18 due to valve seats 112 and 124 being biased upward opening ports 88 and 90. Intermediate chambers 42 and 48 are also open to exhaust passage 18 through cross passages 80 and 82, respectively, through passages 84 and 86, respectively. The fluid pressure below piston 110 and 122 of valve members 102 and 104, respectively, bias valve members 102 and 104 upward maintaining control valve system 10 in the deactuated position. The connection between passages 40 and 52 through annular passage 114 and the connection between passages 46 and 58 through annular passage 126 maintain fluid pressure within chambers 54 and 60 and reservoirs 24 and 26.

Figure 3:
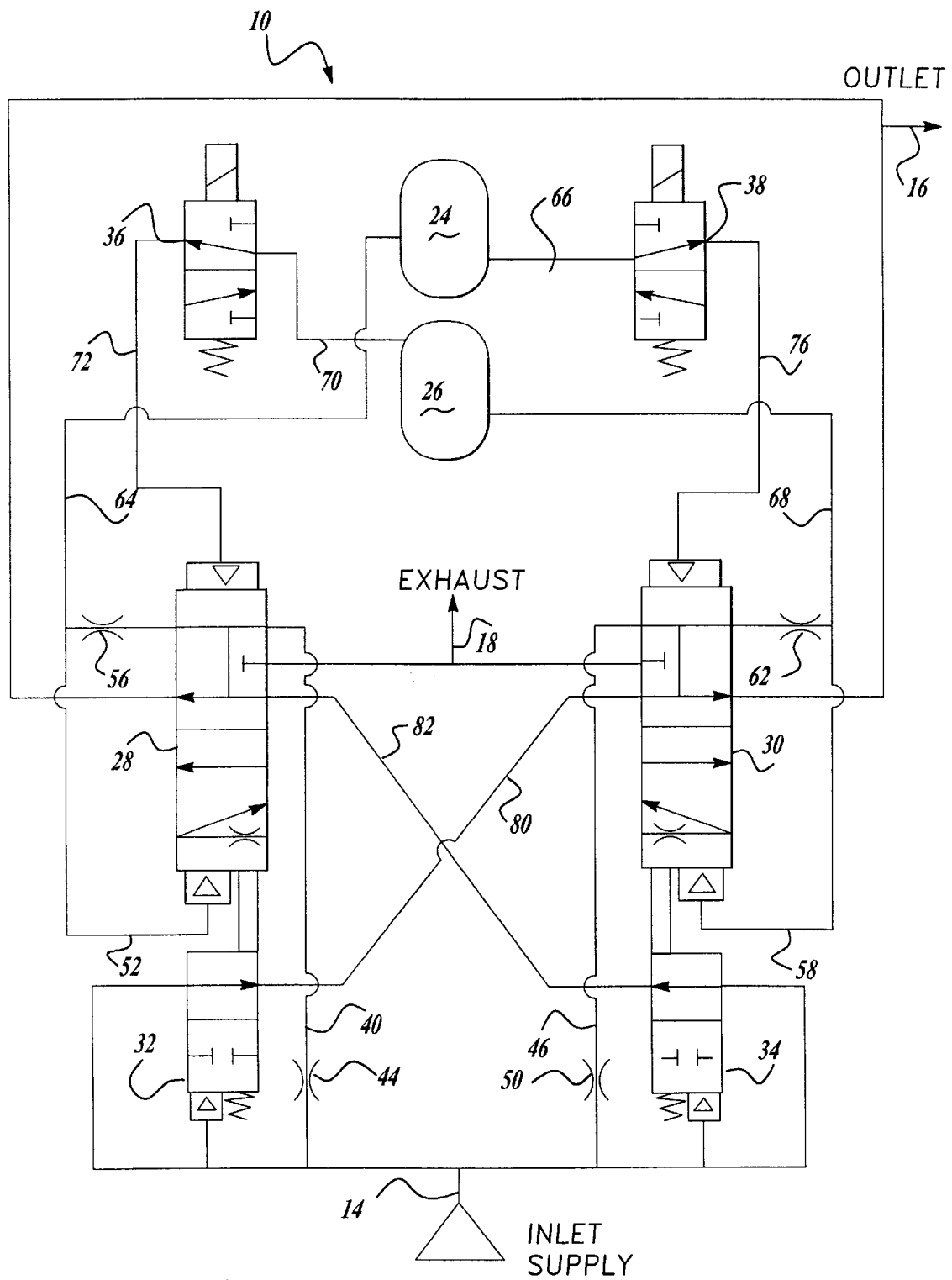
FIG. 3 is a schematic circuit diagram of the control valve system of the present invention shown in an actuated position.
Figure 4:
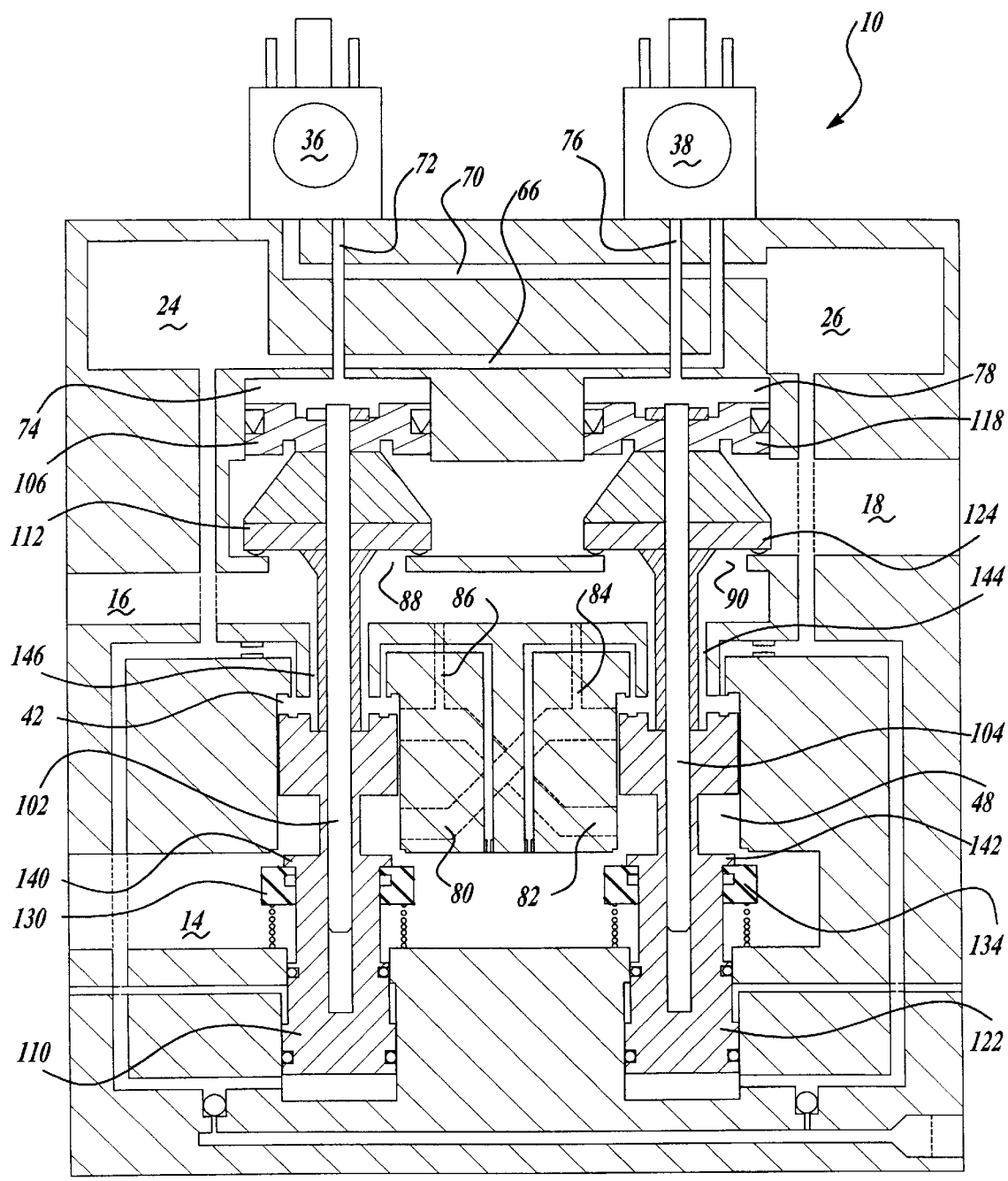
FIG. 4 is a schematic illustration of the control valve shown in its actuated position.

FIGS. 3 and 4 illustrate control valve system 10 in its actuated position. Both solenoid valves 36 and 38 have been substantially simultaneously actuated. The actuation of solenoid valve 36 connects passage 70 and thus reservoir 26 to passage 72. Pressurized fluid is directed into chamber 74 to move valve member 102 downward as shown in FIG. 4. The diameter of piston 106 is larger than the diameter of piston 110 thus causing the load which moves valve member 102 downward. In a similar manner, the actuation of solenoid valve 38 connects passage 66 and thus reservoir 24 to passage 76. Pressurized fluid is directed into chamber 78 to move valve member 104 downward as shown in FIG. 4. The diameter of piston 118 is larger than the diameter of piston 122 thus causing the load which moves valve member 104 downward. When valve members 102 and 104 move downward, an annular flange 140 on piston 110 unseats valve seat 130 and an annular flange 142 on piston 122 unseats valve 134. Pressurized fluid flows from inlet passage 14 into the lower portion of chamber 42 through passage 80 to the upper portion of chamber 48 and through a gap 144 between valve member 104 and housing 12 to provide pressurized fluid to outlet passage 16. Pressurized fluid also flows through passage 84 to outlet passage 16. In a similar manner, pressurized fluid flows from inlet passage 14 into the lower portion of chamber 48 through passage 82 to the upper portion of chamber 42 and through a gap 146 between valve member 102 and housing 12 to provide pressurized fluid to outlet passage 16. Pressurized fluid also flows through passage 86 to outlet passage 16. The movement of valve members 102 and 104 downward seats valve seats 112 and 124 against housing 12 to close ports 88 and 90 to isolate outlet passage 16 from exhaust passage 18. The fluid pressure within reservoirs 24 and 26 will initially be reduced when valves 36 and 38 are actuated by the fluid pressure will return to supply pressure at inlet 14 because reservoirs 24 and 26 are still open to inlet 14 and outlet 16 is isolated from exhaust 18.

Figure 5:
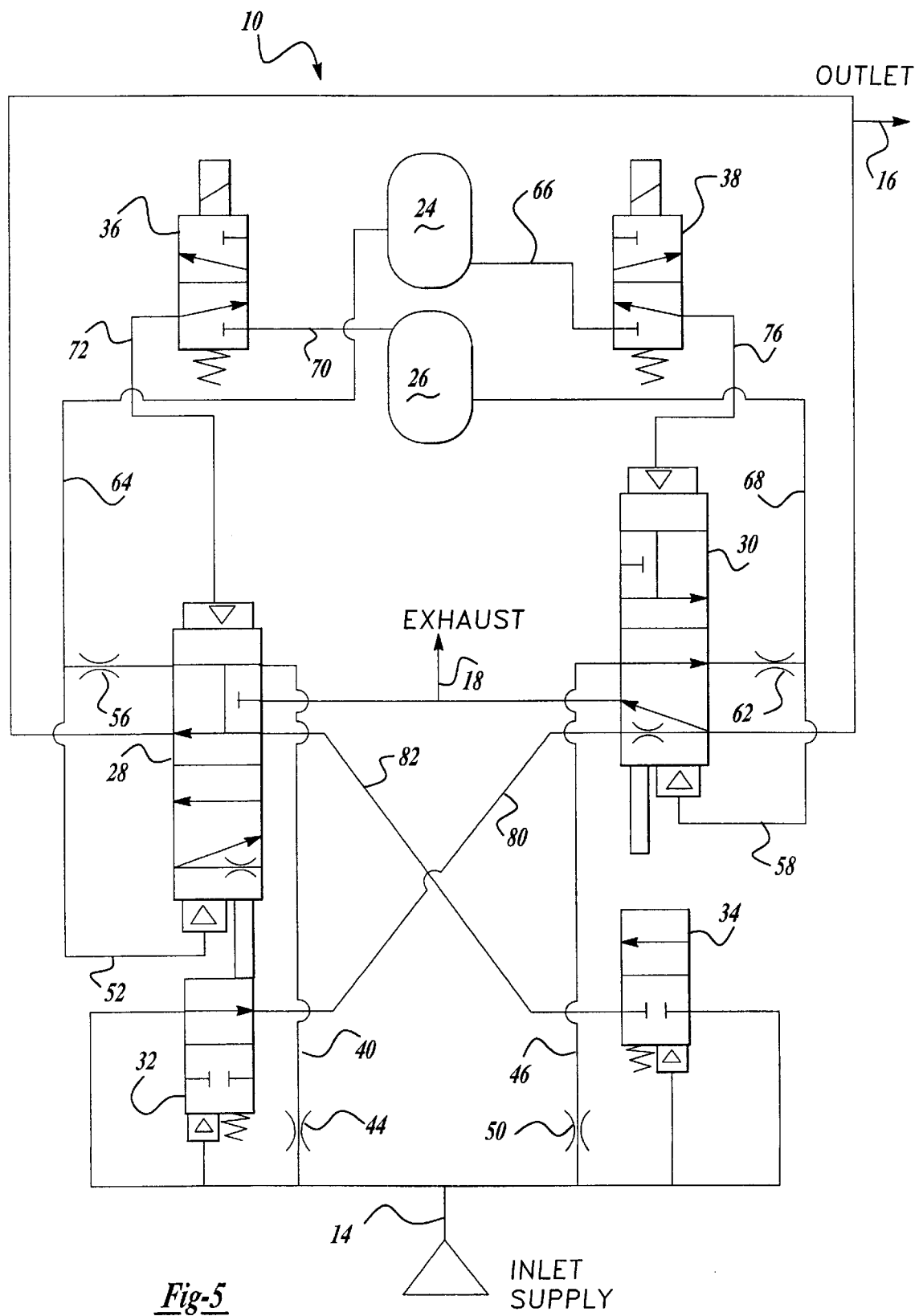
FIG. 5 is a schematic circuit diagram of the control valve system of the present invention shown in an abnormal position.
Figure 6:
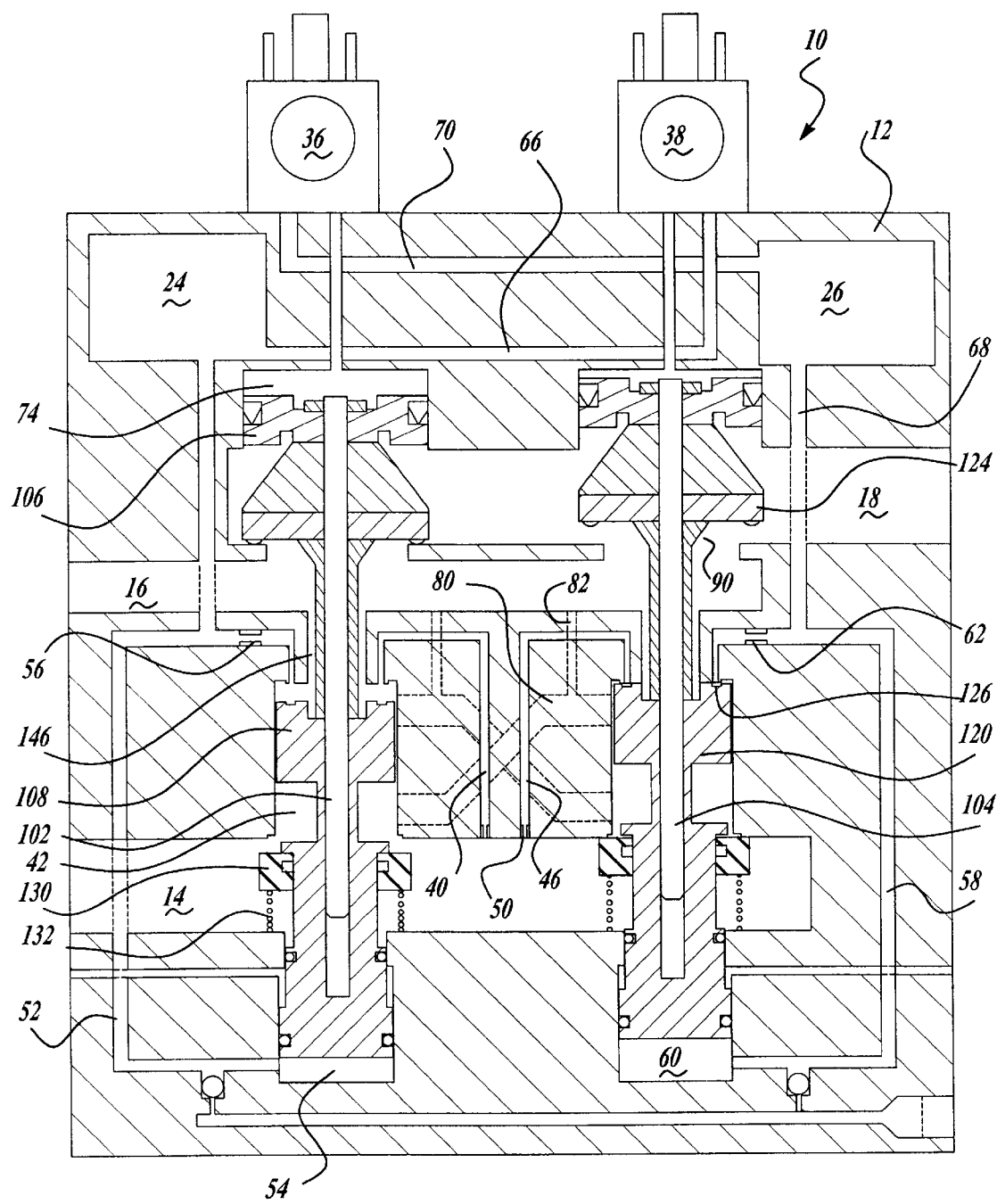
FIG. 6 is a schematic illustration of the control valve shown in its abnormal position.

FIGS. 5 and 6 illustrate control valve system 10 in an abnormal position. In FIGS. 5 and 6, valve member 104 is located in its upward position while valve member 102 is located in its lower position. Both solenoid valves 36 and 38 are located in their deactuated position. Valve member 104 is located in its upward position similar to that shown in FIG. 1. Pressurized fluid from inlet passage 14 is supplied to passage 46 through restrictor 50 to passage 58 through annular passage 126 through restrictor 62 and into chamber 60 to bias valve member 104 upward as shown in FIG. 6 seating piston 120 against housing 12. Pressurized fluid also flows through passage 68 to reservoir 26 and from reservoir 26 to the inlet of solenoid valve 36 through passage 70. Outlet passage 16 is in communication with exhaust passage 18 due to valve seat 124 being biased upward opening port 90. Valve member 102 is located in its lower position which opens various passages to outlet passage 16 which, because the position of valve member 104, is open to exhaust 18. The upper portion of chamber 42 is open to exhaust through gap 146. Pressurized fluid from inlet passage 14 is bled to exhaust through passage 40 and through the upper portion of chamber 42 through gap 146, through outlet passage 16, through port 90 to exhaust passage 18. In addition, pressurized fluid from inlet passage 14 will bleed to exhaust 18 by entering the lower portion of chamber 42, flow through passage 80, through passage 84, through outlet passage 16, through port 90 and into exhaust passage 18. Pressurized fluid in passage 52 and thus chamber 54 is also bled to exhaust through restrictor 56 which removes the biasing being applied to valve member 102. A leak path also exists from inlet 14 to the lower portion of chamber 42 to the upper portion of chamber 42 via a gap between piston 108 and the walls of bore 20. From the upper portion of chamber 42, fluid pressure may escape as described above. Yet another leak path exists from the lower portion of chamber 42 through passage 80, from upper portion to lower portion of chamber 48, and through passage 82 into upper portion of chamber 42. From the upper portion of chamber 42, fluid pressure may escape as described above. In addition, fluid pressure in reservoir 24 is bled to exhaust through restrictor 56 removing the pressurized fluid being supplied to solenoid valve 38 through passage 66. The amount of time for chamber 54 and reservoir 24 to bleed to exhaust will depend upon the size of chamber 54, reservoir 24 and restrictor 56. With the release of pressurized air from chamber 74 above piston 106 and the presence of pressurized air within inlet passage 14 acting against the bottom of valve seat 130, valve spring 132 will move valve member 102 to an intermediate position where valve seat 130 is seated against housing 12 but piston 108 is not seated against housing 12. This condition is shown in FIGS. 7 and 8.

Figure 7:
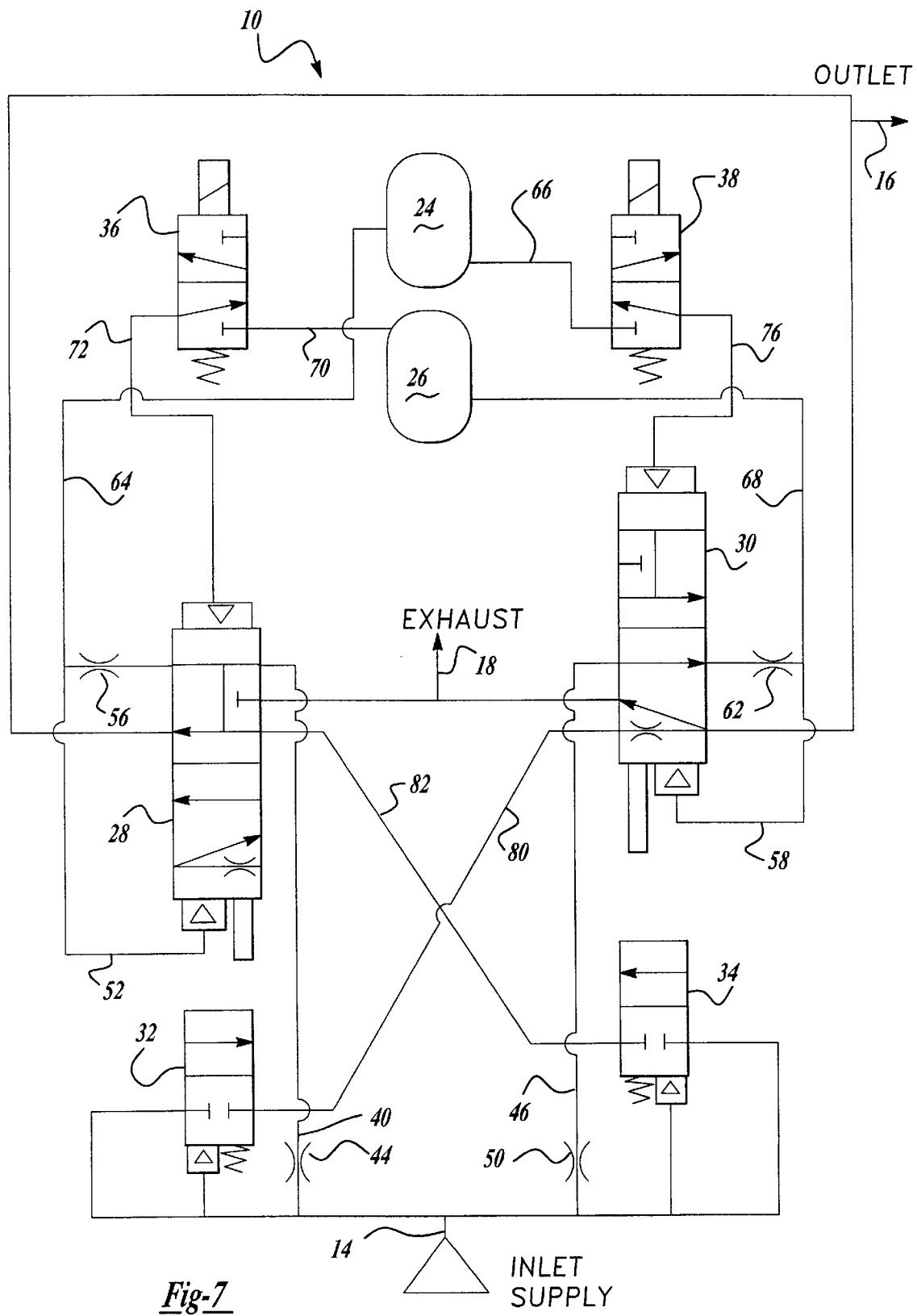
FIG. 7 is a schematic circuit diagram of the control valve system of the present invention shown in a locked out position.
Figure 8:
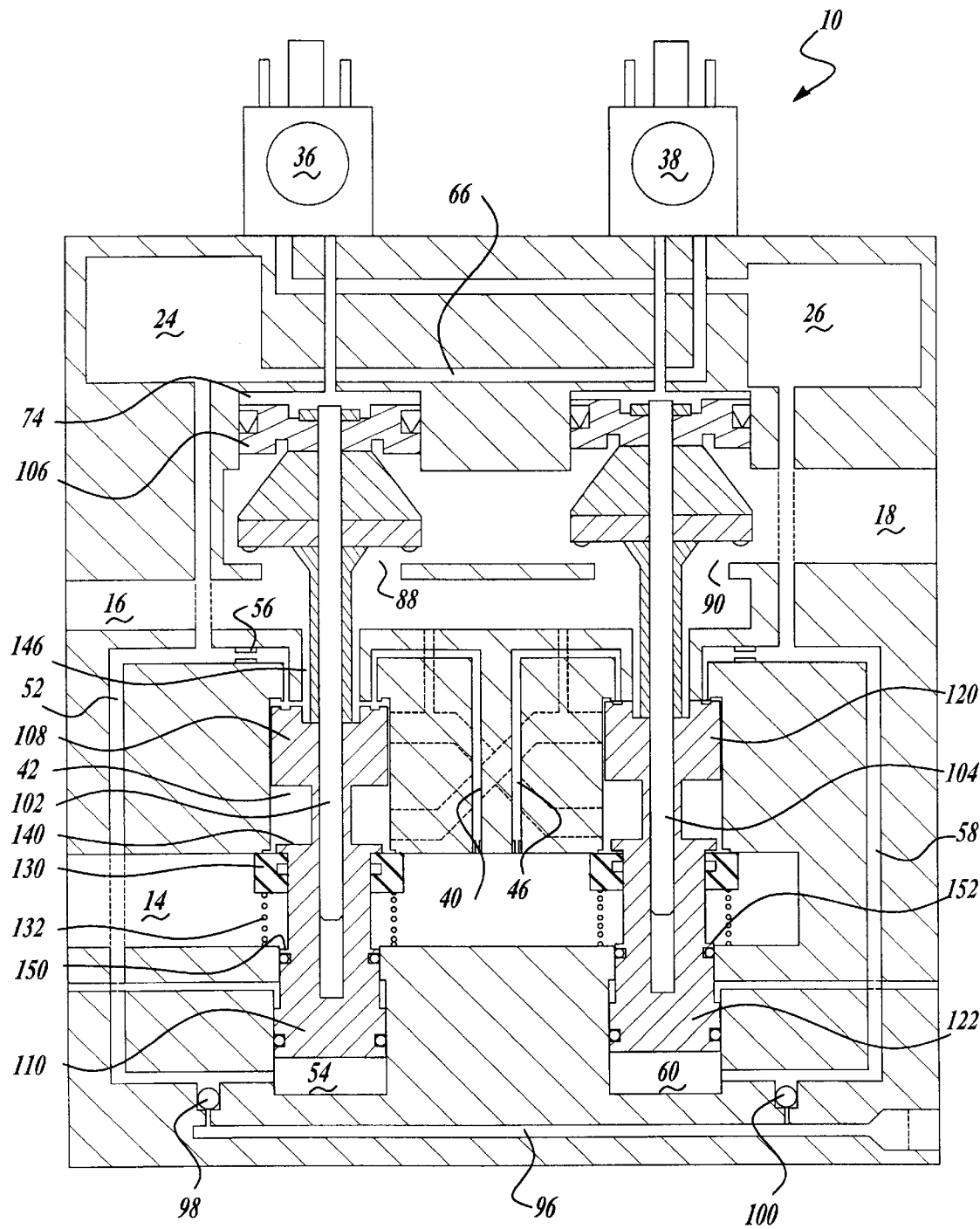
FIG. 8 is a schematic illustration of the control valve shown in its locked out position.

FIGS. 7 and 8 illustrate control valve system 10 in a locked out position. When valve seat 130 urges valve member 102 upwards due to the biasing of valve spring 132, valve seat 130 pushes against annular flange 140 to move valve member 102. Because of a lost motion attachment between valve seat 130 and piston 110, when valve seat 130 engages housing 12, piston 108 has not yet engaged housing 12. Additional movement of valve member 102 is required to seat piston 108 against housing 12 and connect passage 40 to passage 52 and provide pressurized fluid to chamber 54 and reservoir 24. Without the seating of piston 108 to housing 12, the upper portion of chamber 42 and thus passages 40 and 52 are open to exhaust 18 through gap 146, outlet passage 16 and ports 88 and 90 and exhaust passage 18. Thus reservoir 24 is open to exhaust along with passage 66 and the input to solenoid valve 38. Chamber 54 is also open to exhaust eliminating any biasing load which would urge valve member 102 upward to seat piston 108 against housing 12. An annular shoulder 150 located on piston 110 and open to inlet passage 14 biases valve member 102 downward with annular flange 140 being urged against valve seat 130 to keep valve member 102 in its intermediate position and control valve system 10 in its locked out position. A similar shoulder 152 is located on piston 122.

When it is desired to move control valve system 10 from its locked out position to its deactuated position shown in FIG. 1, pressurized fluid is supplied to reset passage 96. Pressurized fluid being supplied to reset passage 96 opens check valve 98 and pressurized fluid fills reservoir 24 and chamber 54. Restrictor 56 will limit the amount of fluid bled off to exhaust during the resetting procedure. Once reservoir 24 and chamber 54 are filled with pressurized fluid, the fluid within chamber 54 acts against piston 110 to move valve member 102 upward to seat piston 108 against housing 12. Fluid passage 40 is again in communication with passage 52 and control valve system 10 is again positioned in its deactuated position as shown in FIGS. 1 and 2.

While the above description of FIGS. 5 through 8 have been described with valve member 102 being located in its intermediate and locked out position and valve member 104 being located in its deactuated position, it is to be understood that a similar locked out position of control valve system 10 would occur if valve member 102 were located in its deactuated condition and valve member 104 were located in its intermediate and locked out condition. The resetting procedure of applying pressurized fluid to reset passage 96 would cause the pressurized fluid to open check valve 100 to fill reservoir 26 and chamber 60. The pressurized fluid in chamber 60 would lift valve member 104 to seat piston 120 against housing 12 reconnecting passage 46 with passage 58.

Thus, control valve system 10 is a fully fluid operating valve system which has the capability of sensing an abnormal condition and responding to this abnormal condition by switching to a locked out condition which then requires an individual to go through a resetting operation before control valve system 10 will again function.

Figure 9:
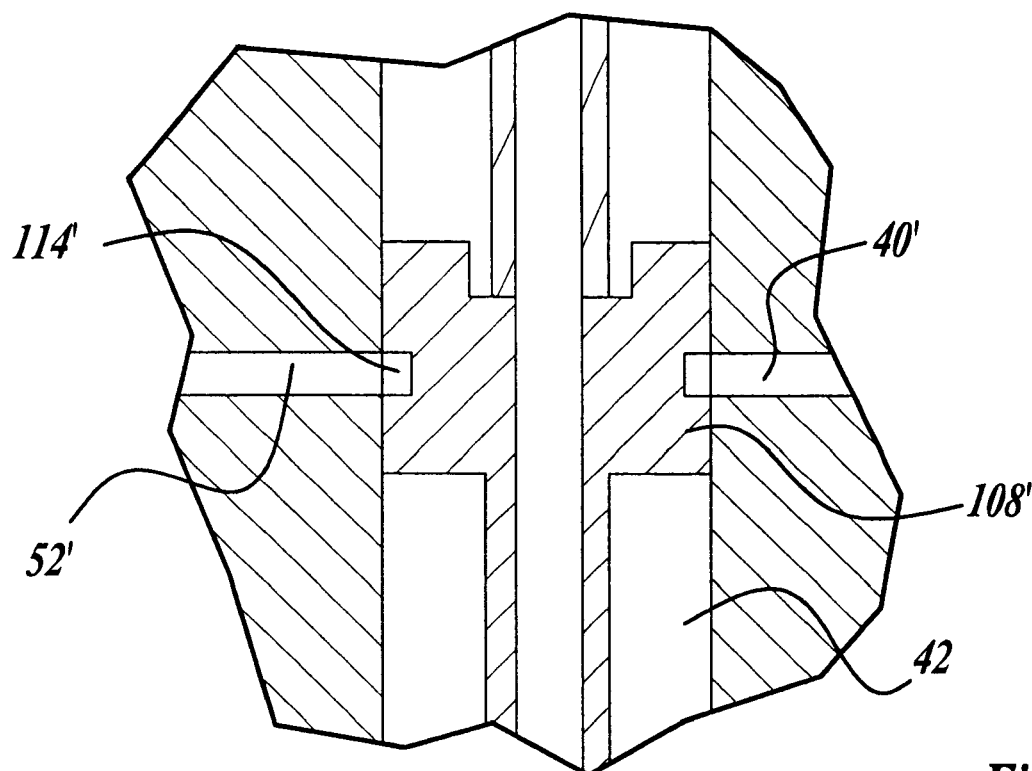
FIG. 9 is a schematic illustration of the valving system in accordance with another embodiment of the present invention.

FIG. 9 illustrates another embodiment of the present invention. In the embodiment shown in FIGS. 1–8, piston 108 includes annular passage 114 located in an upper surface of piston 108 to fluidically connect passage 40 with passage 52. FIG. 9 illustrates a piston 108' which fluidically connects a passage 40' with a passage 52' through a passage 114' located on the external surface of piston 108'. In a similar manner, piston 120 of valve member 104 could be replaced with piston 108'. Fluid passage 40' is the same as fluid passage 40 and fluid passage 52 is the same as fluid passage 52 with the exception that passages 40' and 52' enter chamber 42 through a vertical wall whereas passages 40 and 52 enter chamber 42 through a horizontal wall. The operation of the embodiment shown in FIG. 9 is identical to that described above for FIGS. 1 through 8.

FIGS. 10 through 19 illustrate a control valve system having anti-tiedown capability in accordance with the present invention which is designated generally by the reference numeral 510. It should be noted that in FIGS. 10 through 19, like reference numerals designate like or corresponding parts throughout the several views. It should also be noted that like or corresponding parts from FIGS. 1 through 8 will have added 500 to the reference numerals of FIGS. 1 through 9. Control valve system 510 is shown as a schematic fluid circuit in FIG. 10 and as a fluid control valve in FIG. 11.

Figure 11:
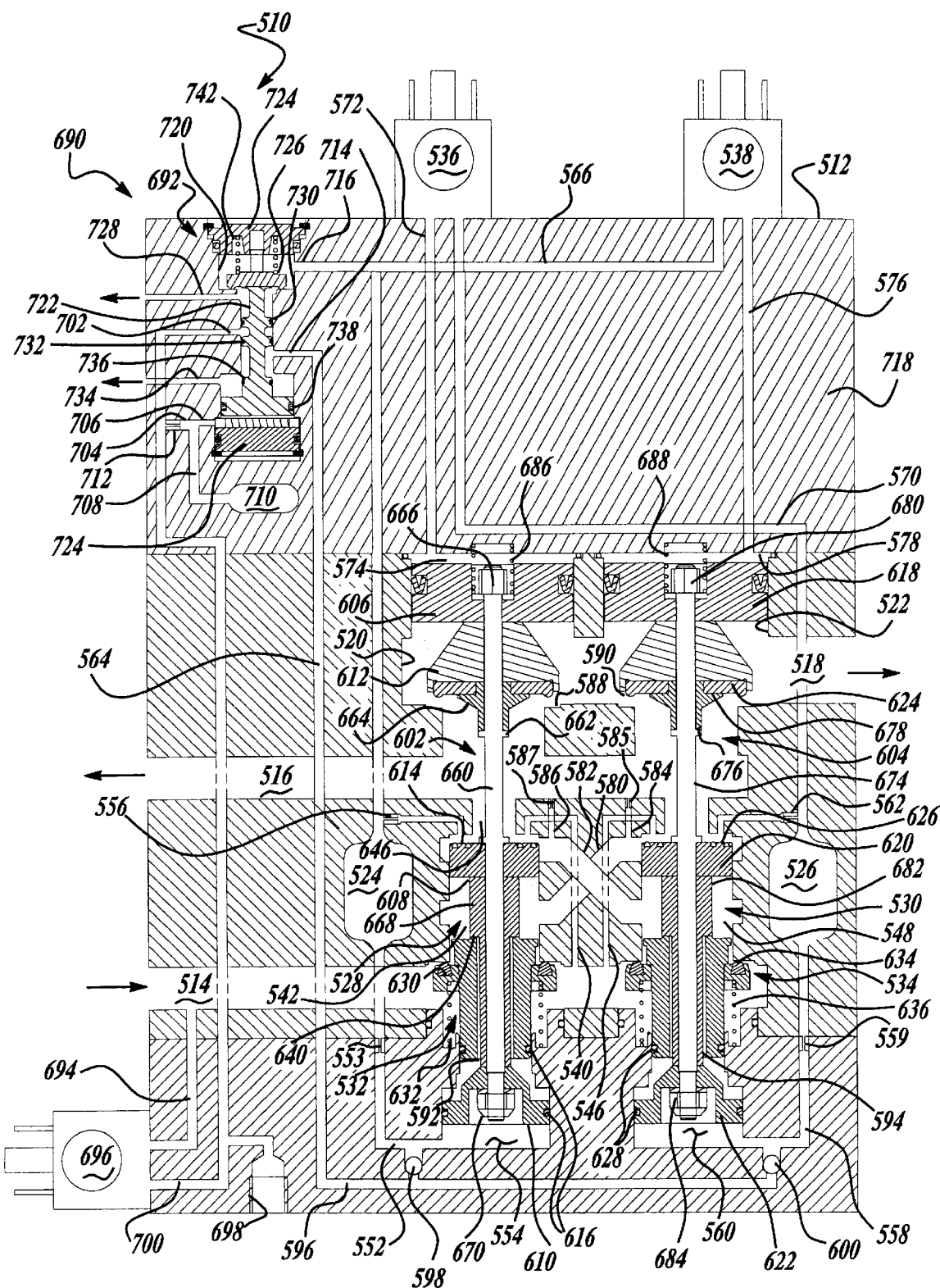
FIG. 11 is a cross sectional view of the control valve system shown in the pre-start condition.

Referring now to FIG. 11, control valve system 510 comprises a housing 512 having a fluid inlet passage 514, a fluid outlet passage 516, a fluid exhaust passage 518, a first valve bore 520, a second valve bore 522, a first fluid reservoir 524, and a second fluid reservoir 526. Disposed within first valve bore 520 is a first valve member 528, and disposed within second valve bore 522 is a second valve member 530. Located within inlet passage 514 in a coaxial relationship with first valve member 528 is a third valve member 532. Also located within inlet passage 514 in a coaxial relationship with second valve member 530 is a fourth valve member 534. A pair of solenoid valves 536 and 538 are attached to housing 512.

A plurality of fluid passages interconnect valve bores 520 and 522 with inlet 514, outlet 516, exhaust 518, reservoir 524, reservoir 526, solenoid valve 536 and solenoid valve 538. A fluid passage 540 extends between inlet passage 514 and an intermediate chamber 542 formed by bore 520. A fluid passage 546 extends between inlet passage 514 and an intermediate chamber 548 formed by bore 522.

A fluid passage 552 extends between chamber 542 and a lower chamber 554 formed by bore 520. A restrictor 556 is disposed within passage 552 to limit the amount of fluid flow through passage 552. A fluid passage 558 extends between chamber 548 and a lower chamber 560 formed by bore 522. A restrictor 562 is disposed within passage 558 to limit the amount of fluid flow through passage 558. Reservoir 524 forms part of passage 552 such that restrictor 556 is located between chamber 542 and reservoir 524.

A restrictor 553 is disposed within passage 552 between reservoir 524 and lower chamber 554 to limit the amount of fluid flow between lower chamber 554 and reservoir 524. A fluid passage 566 extends between reservoir 524 and the input to solenoid valve 538. Reservoir 526 forms part of passage 558 such that restrictor 562 is located between chamber 548 and reservoir 526. A restrictor 559 is disposed within passage 558 between reservoir 526 and lower chamber 560 to limit the amount of fluid flow between lower chamber 560 and reservoir 526.

A fluid passage 570 extends between reservoir 526 and the input to solenoid valve 536. A passage 572 extends between the output of solenoid valve 536 and an upper chamber 574 formed by bore 520. A fluid passage 576 extends between the output of solenoid valve 538 and an upper chamber 578 formed by bore 522.

A cross passage 580 extends between the lower portion of chamber 542 and the upper portion of chamber 548. A cross passage 582 extends between the lower portion of chamber 548 and the upper portion of chamber 542. A fluid passage 584 extends between passage 580 and outlet passage 516. A restrictor 585 is disposed within passage 584 to limit the amount of fluid flow through passage 584. A fluid passage 586 extends between passage 582 and outlet passage 516. A restrictor 587 is disposed within passage 586 to limit the amount of fluid flow through passage 586. Outlet passage 516 is in communication with exhaust passage 518 through two ports 588 and 590. The upper portions of chambers 554 and 560 are in communication with exhaust port 18 through passages 592 and 594, respectively.

A reset passage 596 extends through housing 512 and is in communication with the lower portion of chambers 554 and 560 by communicating with passages 552 and 558, respectively. A pair of check valves 598 and 600 are disposed between reset passage 596 and passages 552 and 558 respectively, to prohibit fluid flow between passages 552 or 558 to reset passage 596 but allow fluid flow from reset passage 596 to one or both passages 552 and 558.

Disposed within bore 520 is valve member 602 and disposed within bore 522 is valve member 604. Valve member 602 comprises an upper piston 606, an intermediate piston 608 and a lower piston 610, all of which move together as a single unit. Upper piston 606 is disposed within chamber 574 and includes a valve seat 612 which opens and closes port 588 located between outlet passage 516 and exhaust passage 518. Intermediate piston 608 is disposed within chamber 542 and includes an annular passage 614 which fluidly connects passage 540 to passage 552 when piston 608 is seated against housing 512. Lower piston 610 is located within chamber 554. A pair of seals 616 seal inlet passage 514 from passage 592 and seal chamber 554 from passage 592.

As described above, valve member 602 comprises an upper piston 606, and intermediate pistons 608, and a lower piston 610, all of which move together as a single unit. The respective pistons 606, 608, and 610 each include central bores through which passes a valve stem 660. Valve stem 660 includes a pair of lands 662 which provide end stops for one or more of the respective pistons. For example, upper piston 606, valve seat 612, and spacer 664 are seated on an upper land 662. A nut 666 threadably engages a threaded portion of valve stem 660 to maintain upper piston 606, valve seat 612, and spacer 664 against upper land 662. Similarly, a lower land 662 provides an end stop for intermediate piston 608, a spacer 668, and lower piston 610, which are retained against the lower land 662 via a nut 670 which threadably engages a lower end of valve stem 660. Spacer 668 is formed so that valve member 602 moves independently from valve member 532.

Valve member 604 comprises an upper piston 618, an intermediate piston 620 and a lower piston 622 all of which move together as a single unit. Upper piston 618 is disposed within chamber 578 and includes a valve seat 624 which opens and closes port 590 located between outlet passage 516 and exhaust passage 518. Intermediate piston 620 is disposed within chamber 548 and includes an annular passage 626 which fluidly connects passage 546 to passage 558 when piston 620 is seated against housing 512. Lower piston 622 is located within chamber 560. A pair of seals 628 seal inlet passage 514 from passage 594 and seal chamber 560 from passage 594.

As described above, valve member 604 comprises an upper piston 618, an intermediate piston 620, and a lower piston 622, all of which move together as a single unit. The respective pistons 618, 620, and 622 each include central bores through which passes a valve stem 674. Valve stem 674 includes a pair of lands 676 which provide end stops for one or more of the respective pistons. For example, upper piston 618, valve seat 624, and spacer 678 are seated on an upper land 676. A nut 680 threadably engages a threaded portion of valve stem 674 to maintain upper piston 618, valve seat 624, and spacer 678 against upper land 676. Similarly, a lower land 676 provides an end stop for intermediate piston 620, a spacer 682, and lower piston 622 are retained against the lower land 676 via a nut 684 which threadably engages a lower end of valve stem 674. Spacer 682 is formed so that valve member 604 moves independently from valve member 534.

Valve member 532 is located around spacer 668 and comprises a valve seat 630 and a valve spring 632. Valve spring 632 biases valve seat 630 against housing 512 to prohibit fluid flow between inlet passage 614 and chamber 642. Valve member 534 is located around spacer 682 and comprises a valve seat 634 and a valve spring 636. Valve spring 636 biases valve seat 634 against housing 512 to prohibit fluid flow between inlet passage 514 and chamber 548.

A particular feature of this invention includes an anti-tiedown circuit 690 which inhibits actuation of first valve member 530 during a reset operation. The anti-tiedown circuit 690 includes an anti-tiedown valve 692. A fluid passage 694 extends between inlet passage 514 to the input to solenoid 696. A fluid passage 700 extends from the output of solenoid 696 to an input port 702 of anti-tiedown valve 692. A reset port 698 fluidly connects to fluid passage 700 and provides an alternative, typically operator supplied, means for pressurizing fluid passage 700. An actuation passage 704 extends between fluid passage 700 and actuation port 706. A reservoir passage 708 extends between actuation passage 704 and fluid reservoir 710. A restrictor 712 is disposed within actuation passage 704 to limit the amount of fluid flow through passage 704. An outlet port 714 connects to reset passage 596. A vent port 716 connects to passage 566.

Anti-tiedown valve 692 comprises a valve body 718 which also forms part of housing 512. Valve body 718 includes a central bore 720. A valve spool 722 translates within central bore 720 between end structures 724. At its upper end, valve spool 722 includes a valve seat 726 which opens and closes a passage between vent port 716 and upper exhaust port 728. Valve spool 722 also includes an o-ring 730 which provides a seal between upper exhaust passage 728 and input port 702. Similarly, o-ring 732 provides a seal between input port 702, outlet port 714, and lower exhaust port 734. A third o-ring 736 provides a seal between outlet port 714 and lower exhaust port 734 when anti-tiedown valve 692 is an actuated position. A fourth o-ring 738 provides a seal between actuation port 706 and second exhaust port 734.

Figure 12:
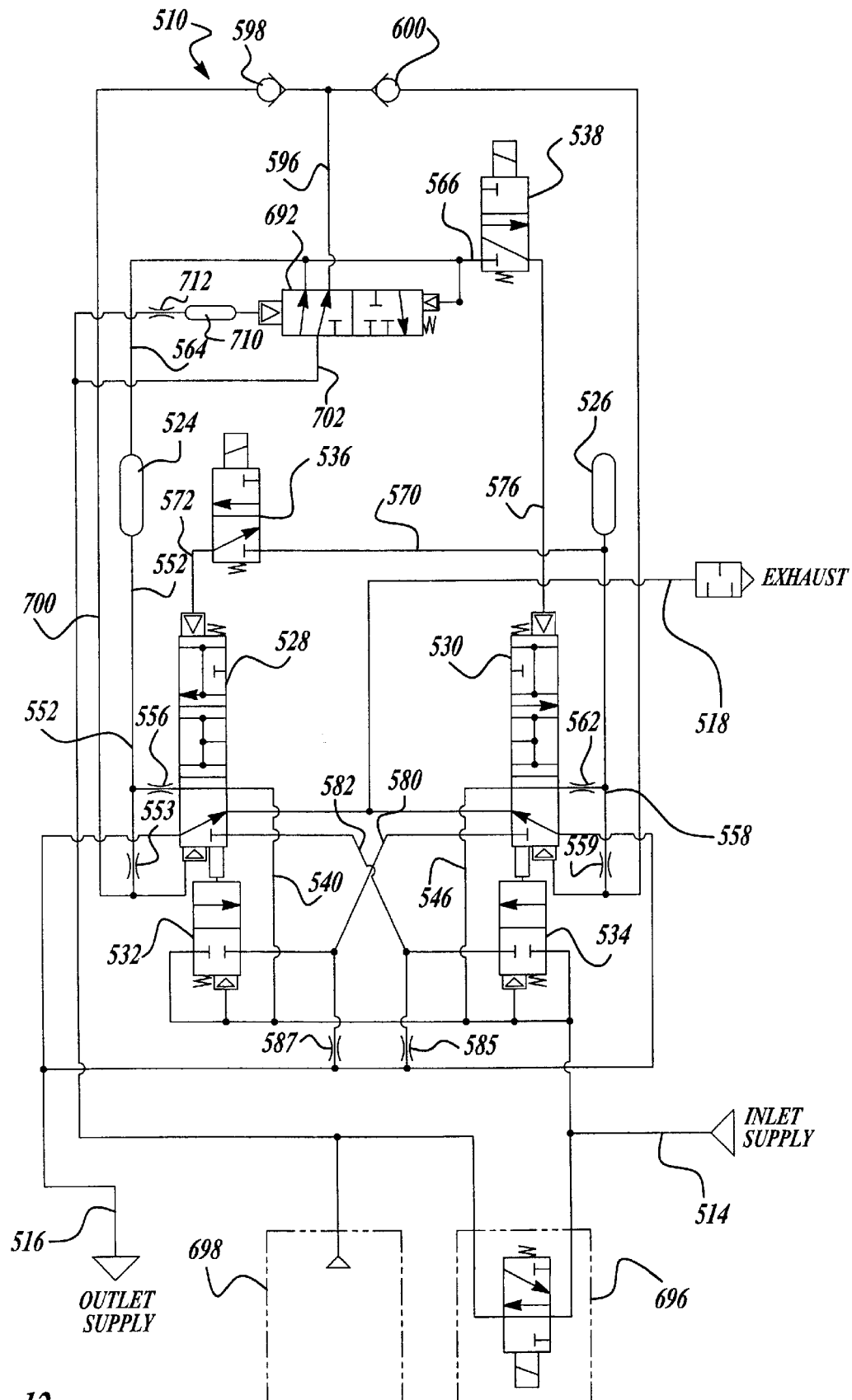
FIG. 12 is a schematic circuit diagram of the control valve system having an anti-tiedown circuit of the present invention shown in a reset position.

FIGS. 11 and 12 illustrate control valve system 510 in an initial position. It should be noted that FIGS. 11 and 12 also illustrate control valve system 510 in a locked out position. A lockout condition occurs when at least one of the intermediate pistons 608 or 620 assumes the position shown in FIG. 11. Displacement of the valves from a locked out to a deactuated position will be described with respect to first valve member 528. However, displacement of second valve member 530 occurs in a similar manner. When valve seat 630 urges valve member 602 upwards due to the biasing of valve spring 632, valve seat 630 pushes against annular flange 640 to move valve member 602. Because first valve member 528 and third valve member 532 may move independently, when valve seat 632 engages housing 512, piston 608 has not yet engaged housing 512. Additional movement of valve member 602 is required to seat piston 608 against housing 512 and connect passage 540 to passage 552 and provide pressurized fluid to chamber 554 and reservoir 524. Without the seating of piston 608 to housing 512, the upper portion of chamber 542 and thus passages 540 and 552 are open to exhaust 518 through gap 646, outlet passage 516, ports 588 and 590, and exhaust passage 18. Thus reservoir 524 is open to exhaust along with passage 566 and the input to solenoid valve 538. Chamber 554 is also open to exhaust eliminating any biasing load which would urge valve member body 602 upward to seat piston 608 against housing 512. A spring 686 urges intermediate piston 608 downward via valve stem 660, with annular flange 640 being urged against valve seat 630 to keep valve member body 602 in its intermediate position and control valve system 510 in its startup (body valves) or locked out (one valve) position. A similar configuration applies to the other main valve.

Figure 14:
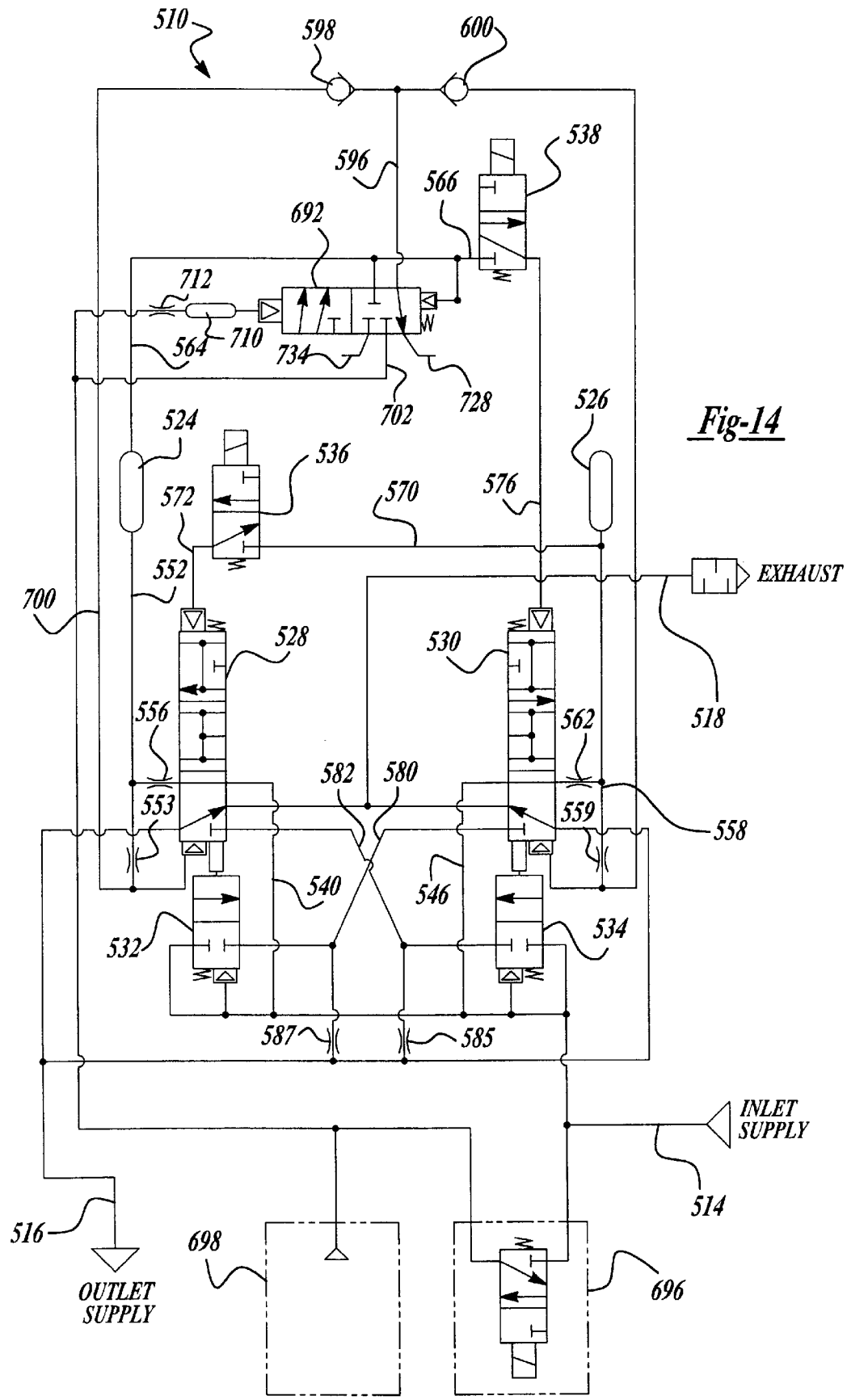
FIG. 14 is a schematic circuit diagram of the control valve system having an anti-tiedown circuit of the present invention shown in a deactuated position.
Figure 15:
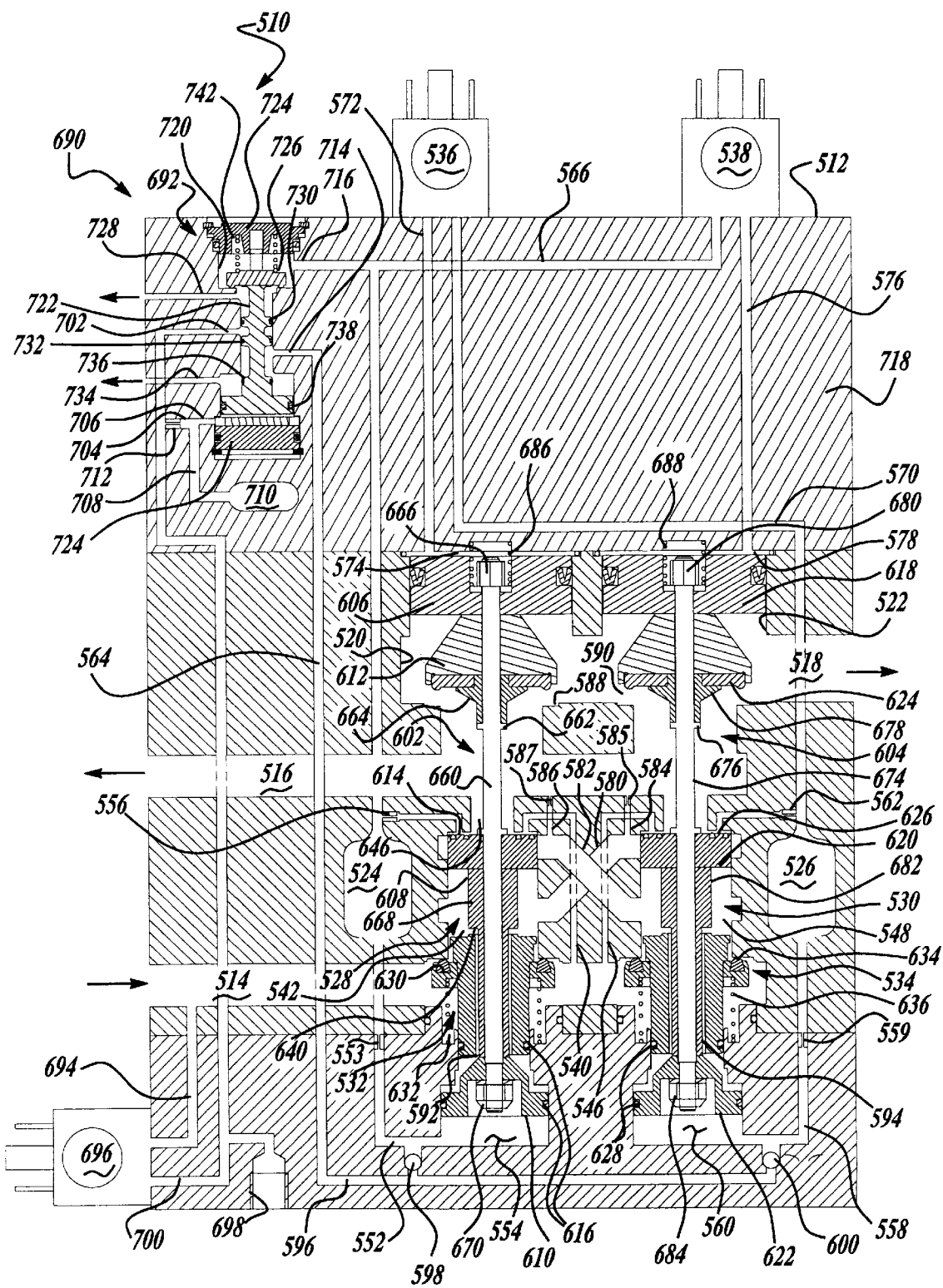
FIG. 15 is a cross-sectional view of the control valve shown in its deactuated position.

When it is desired to move control valve system 510 from its initial, or locked out, position to its deactuated position shown in FIGS. 14 and 15, pressurized fluid must be supplied to reset passage 596. Pressurized fluid being supplied to reset passage 596 opens check valves 598, 600, and pressurized fluid fills reservoirs 554 and 560. Restrictors 556 and 562 will limit the amount of fluid bled off to exhaust during the resetting procedure. Similarly, restrictors 553 and 559 will limit the amount of fluid entering respective reservoirs 524 and 526. Once reservoirs 524 and 526 and chambers 554 and 560 are filled with pressurized fluid, the fluid within chambers 554 and 560 acts against pistons 610 and 622 to move valve members 602 and 604 upward to seat pistons 608 and 620 against housing 512. Fluid passages 540 and 546 are again in communication with passages 552 and 558 and control valve system 510 is again positioned in its deactuated position as shown in FIGS. 14 and 15.

Figure 13:
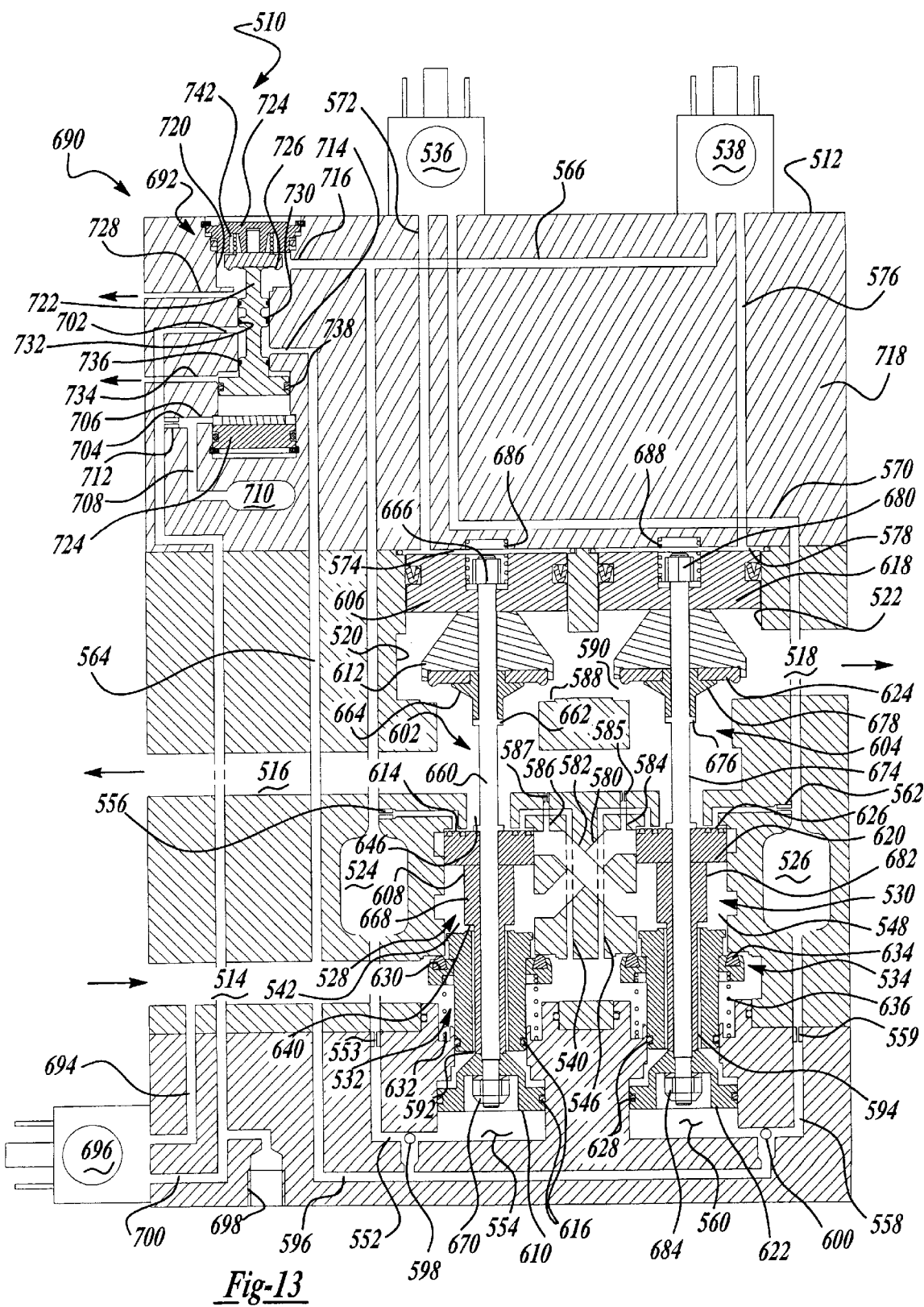
FIG. 13 is a cross-sectional view of the control valve shown in its reset position.

As best illustrated in FIGS. 12 and 13, in a particular feature of the present invention is that pressurization of reset passage 596 is controlled through a novel anti-tiedown circuit 690, including an anti-tiedown valve 692. Anti-tiedown circuit 690 prevents pressurization of reset passage without previous depressurization of reservoir 524 and passage 566, thereby preventing solenoid 538 from providing fluid pressure to passage 576 and chamber 578. This prevents displacement of first valve member 530 to an actuated position. Thus, anti-tiedown valve 692 prevents pressurizing outlet passage 16 during a reset operation.

To effect a reset operation when one or both of first valve member 528 or second valve member 530 is in a locked-out position, such as may occur during initial start up or a locked out condition, fluid passage 700 must be pressurized. Pressurization of fluid passage 700 can occur through reset activation of solenoid 696 which receives input fluid pressure from inlet passage 514 via fluid passage 694. Upon actuation of reset solenoid 696, inlet fluid pressure is applied to fluid passage 700. Alternatively, valve housing 512 includes an optional reset port 698 which may be provided for use with a customer supplied reset fluid pressure.

Upon application of one of the alternative reset signals, fluid pressure and in passage 700 causes upward displacement of valve spool 722 resulting from pressurization of chamber 740. The input fluid pressure applied through fluid passage 700 also pressurizes reservoir 710. Upward displacement of valve spool 722 enables communication between fluid passage 566 and upper exhaust port 728. This vents fluid pressure and reservoir 526 and fluid passage 566 to exhaust, thereby preventing actuation of first valve member 528. Upward displacement of valve spool 722 also enables communication between pressurized fluid passage 700 and reset passage 596, causing displacement of first valve member 528 and/or second valve member 530 to a deactuated position, as described above with respect to FIGS. 10 and 11. During this operation, fluid restrictors 553 and 559 limit fluid flow into respective reservoirs 524 and 526. This ensures that a higher pressure will build in chambers 554 and 560, thereby displacing pistons 608 and 620 upward to effect the reset operation. Further, so long as fluid passage 700 is pressurized, either by reset solenoid 696 or customer supplied reset signal 698, fluid passage 566 will be vented through upper exhaust passage 728, thereby insuring deactuation of first valve member 530.

Upon removal of the reset signal, either through reset solenoid 596 or customer supplied reset support 698, biasing member 742 displaces valve spool 722 downward disabling communication between fluid passage 700 and reset passage 596. Downward displacement of valve spool 722 resultantly closes off communication between fluid passage 700 and reset passage 596, thereby relieving pressure to check valves 598, 600. Downward displacement of valve spool 722 also causes reset passage 596 to vent through lower exhaust port 734, thereby providing a continuous exhaust for reset passage 596 so that reset passage 596 is only pressurized during the reset operation and otherwise vented to exhaust. Also, valve seat 726 closes off communication between passage 566 and upper exhaust port 728, thereby enabling pressurization of reservoir 526. Reservoirs 524 and 526 are thus sufficiently pressurized to maintain a sufficient pressure in respective chambers 554 and 560 to maintain first valve member 528 and second valve member 530 in a deactuated position.

FIGS. 14 and 15 illustrate control valve system 510 in its deactuated position. Pressurized fluid from input passage 514 is biasing valve seats 630 and 634 against housing 512 closing communication between inlet passage 514 and both chambers 542 and 548. Pressurized fluid is provided to passage 540, to passage 552 through annular passage 614 through restrictor 556 to reservoir 524 through restrictor 553 and into chamber 554 to bias valve member 602 upward as shown in FIG. 15 seating piston 608 against housing 512. Pressurized fluid also flows from reservoir 24 to the inlet of solenoid valve 538 through passage 566. In a similar manner, pressurized fluid from input passage 514 is provided to passage 546 to passage 558 through annular passage 626 through restrictor 562 to reservoir 526 through restrictor 559 and into chamber 560 to bias valve member 604 upward as shown in FIG. 15 seating piston 620 against housing 512. Pressurized fluid also flows from reservoir 526 to the inlet of solenoid valve 536 through passage 570. Outlet passage 516 is in communication with exhaust passage 518 due to valve seats 612 and 624 being biased upward opening ports 588 and 590. Intermediate chambers 542 and 548 are also open to exhaust passage 518 through cross passages 580 and 582, respectively, through passages 584 and 586, respectively. The fluid pressure below piston 610 and 622 of valve members 602 and 604, respectively, bias valve members 602 and 604 upward maintaining control valve system 510 in the deactuated position. The connection between passages 540 and 552 through annular passage 614 and the connection between passages 546 and 558 through annular passage 626 maintain fluid pressure within chambers 554 and 560 and reservoirs 524 and 526.

Figure 16:
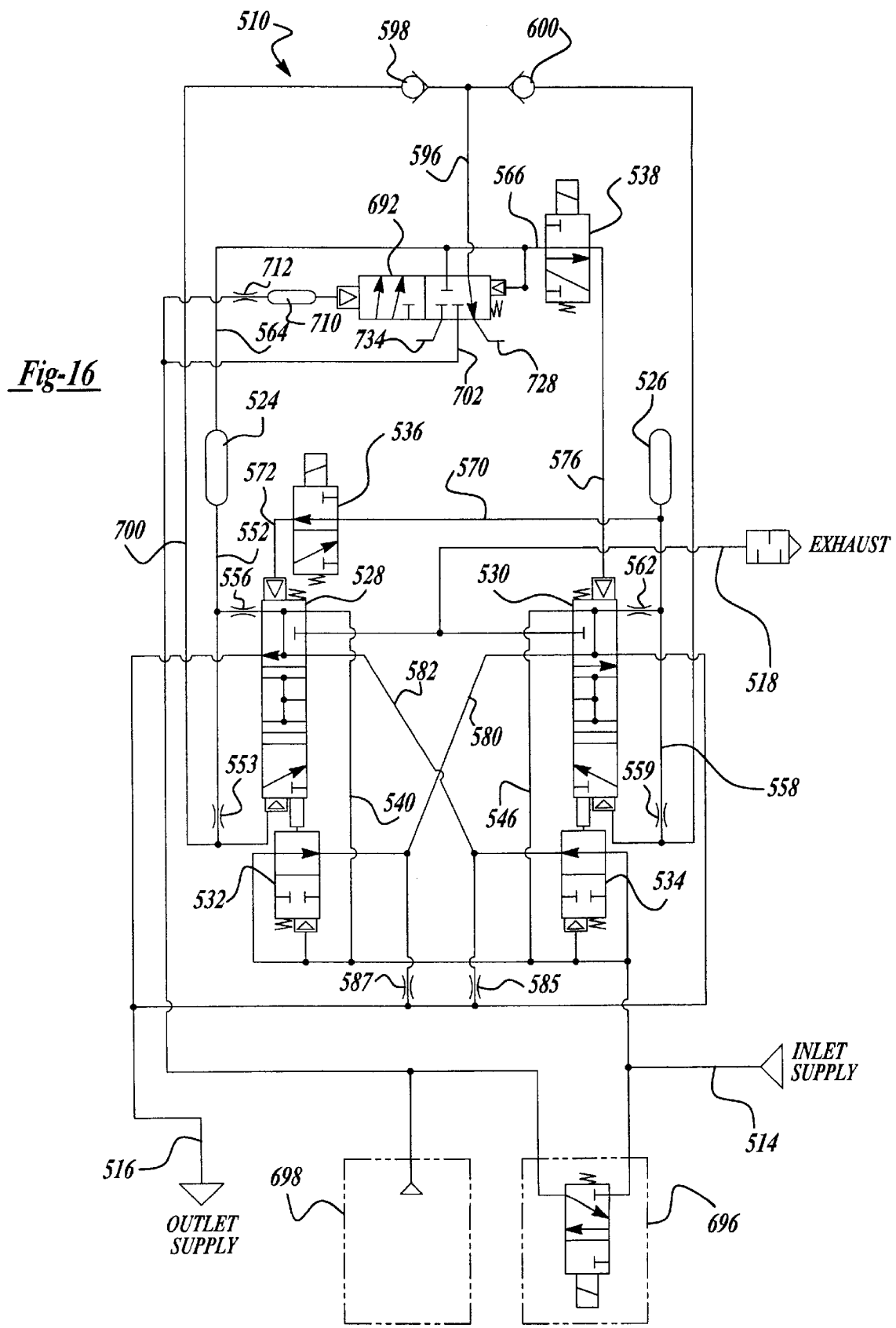
FIG. 16 is a schematic circuit diagram of the control valve system having an anti-tiedown circuit of the present invention shown in an actuated position.
Figure 17:
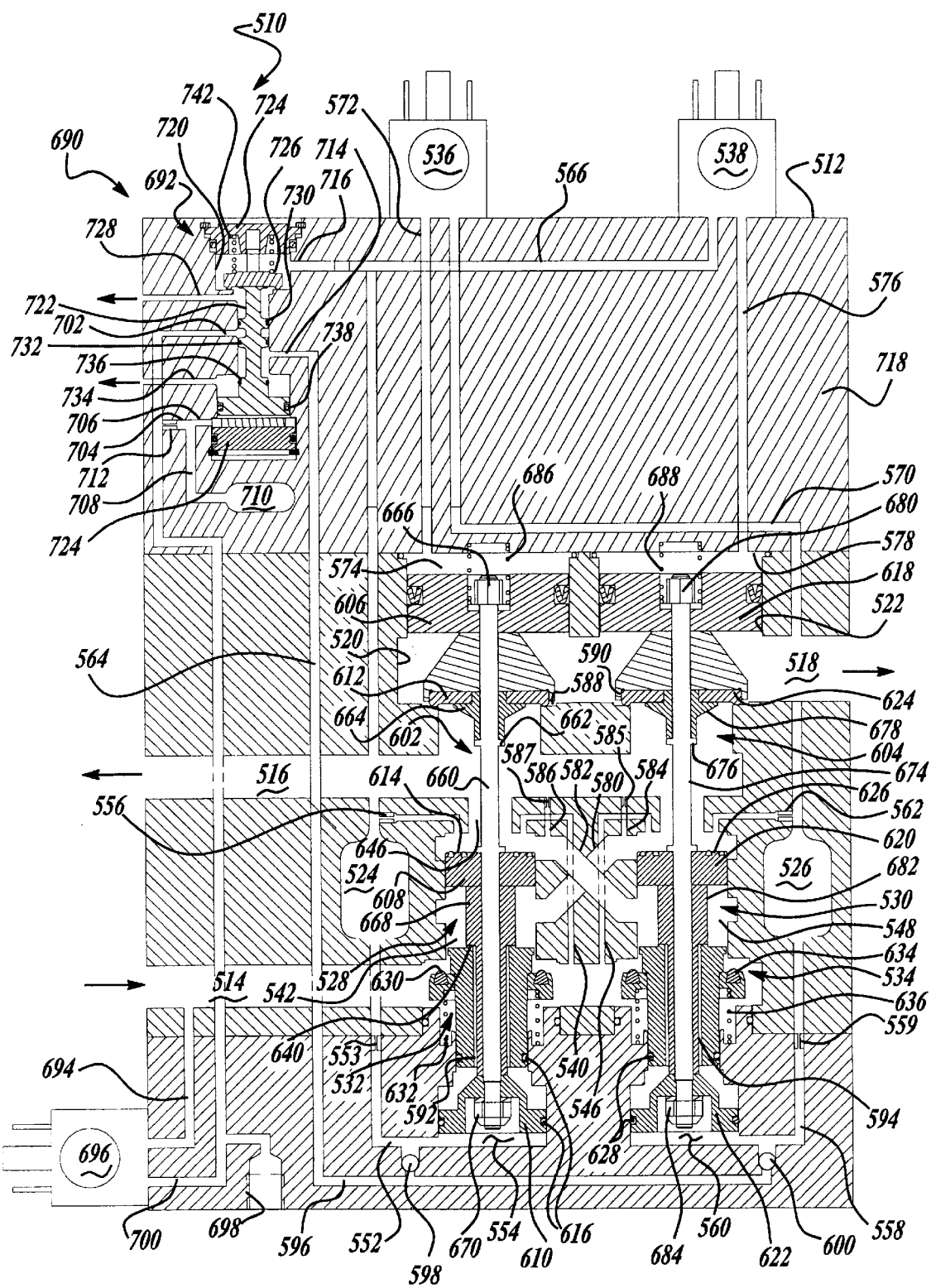
FIG. 17 is a cross-sectional view of the control valve shown in its actuated position.

FIGS. 16 and 17 illustrate control valve system 510 in its actuated position. Both solenoid valves 536 and 538 have been substantially simultaneously actuated. The actuation of solenoid valve 536 connects passage 570 and thus reservoir 526 to passage 572. Pressurized fluid is directed into chamber 574 to move valve member 602 downward as shown in FIG. 17. The diameter of piston 606 is larger than the diameter of piston 610 thus causing the load which moves valve member 602 downward. In a similar manner, the actuation of solenoid valve 538 connects passage 566 and thus reservoir 524 to passage 576. Pressurized fluid is directed into chamber 578 to move valve member 604 downward as shown in FIG. 17. The diameter of piston 618 is larger than the diameter of piston 622 thus causing the load which moves valve member 604 downward. When valve members 602 and 604 move downward, an annular flange 640 on piston 610 unseats valve seat 630 and an annular flange 642 on piston 622 unseats valve 634. Pressurized fluid flows from inlet passage 514 into the lower portion of chamber 542 through passage 580 to the upper portion of chamber 548 and through a gap 644 between valve member 604 and housing 512 to provide pressurized fluid to outlet passage 516. Pressurized fluid also flows through passage 584 to outlet passage 516. In a similar manner, pressurized fluid flows from inlet passage 514 into the lower portion of chamber 548 through passage 582 to the upper portion of chamber 542 and through a gap 646 between valve member 602 and housing 512 to provide pressurized fluid to outlet passage 516. Pressurized fluid also flows through passage 586 to outlet passage 516. The movement of valve members 602 and 604 downward seats valve seats 612 and 624 against housing 512 to close ports 588 and 590 to isolate outlet passage 516 from exhaust passage 518. The fluid pressure within reservoirs 524 and 526 will initially be reduced when valves 536 and 538 are actuated, but the fluid pressure will return to supply pressure at inlet 514 because reservoirs 524 and 526 are still open to inlet 514 and outlet 516 is isolated from exhaust 518.

Figure 10:
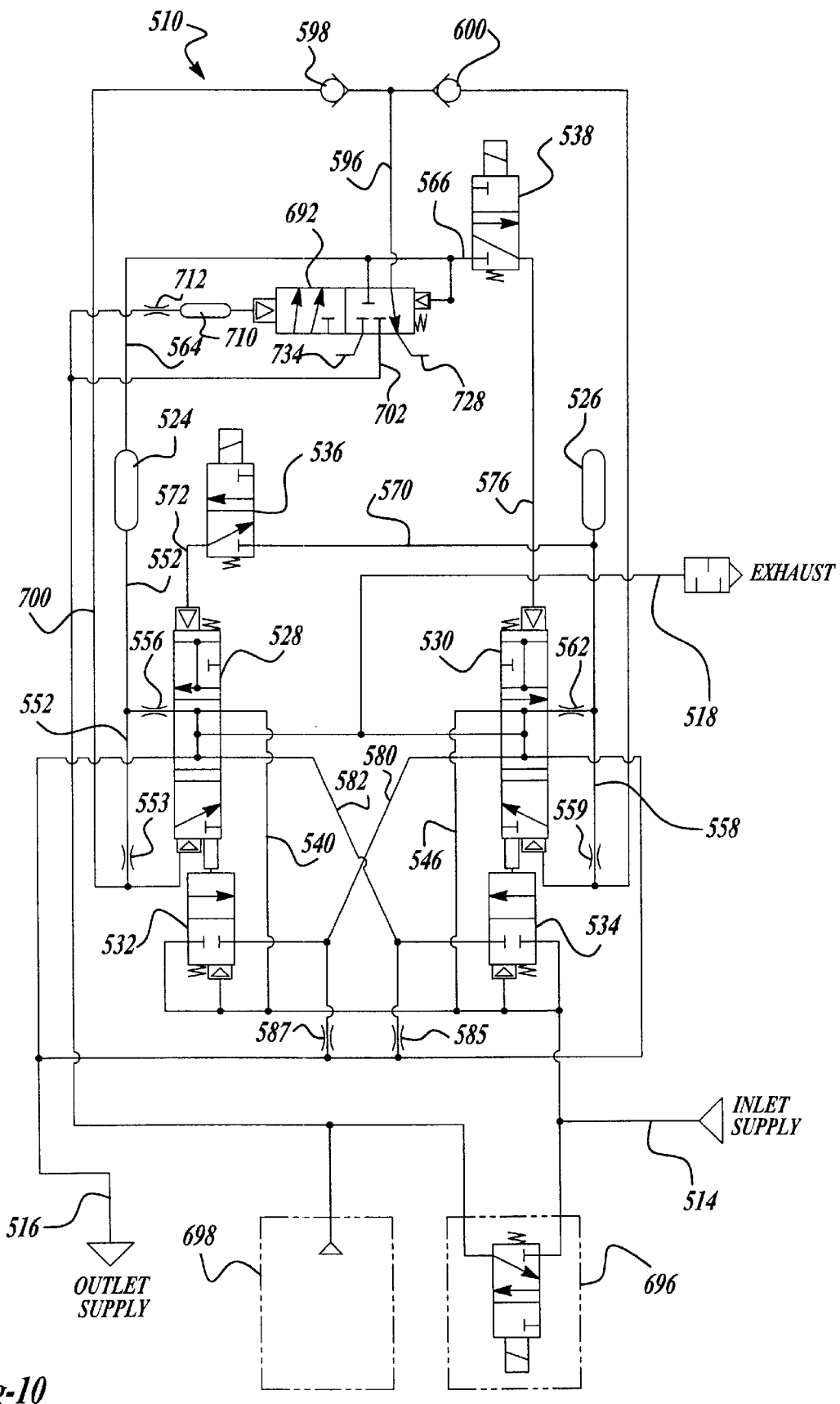
FIG. 10 is a schematic circuit diagram of the control valve system having an anti-tiedown circuit of the present invention shown in a pre-start condition.
Figure 18:
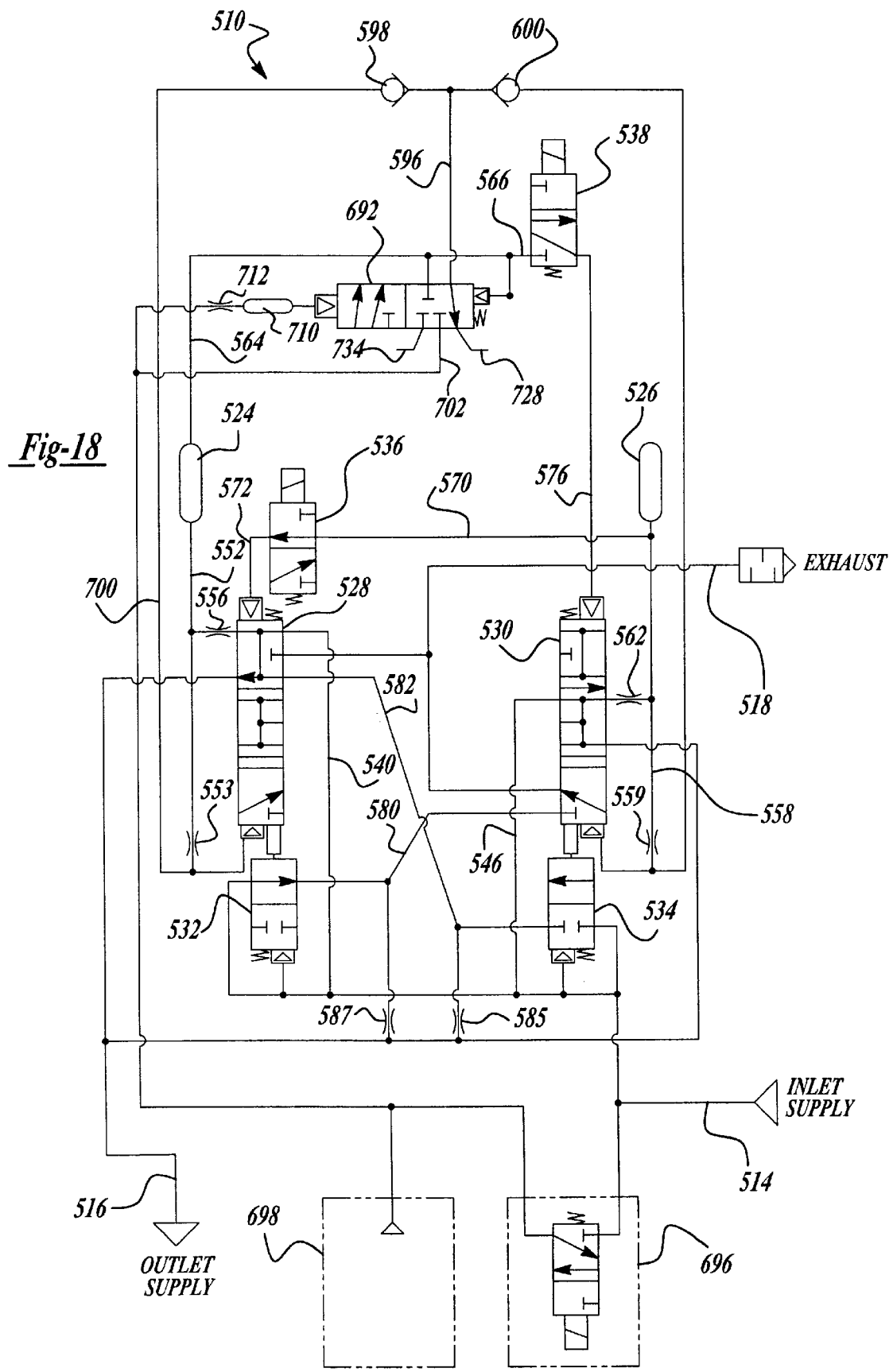
FIG. 18 is a schematic circuit diagram of the control valve system having an anti-tiedown circuit of the present invention shown in an abnormal position.
Figure 19:
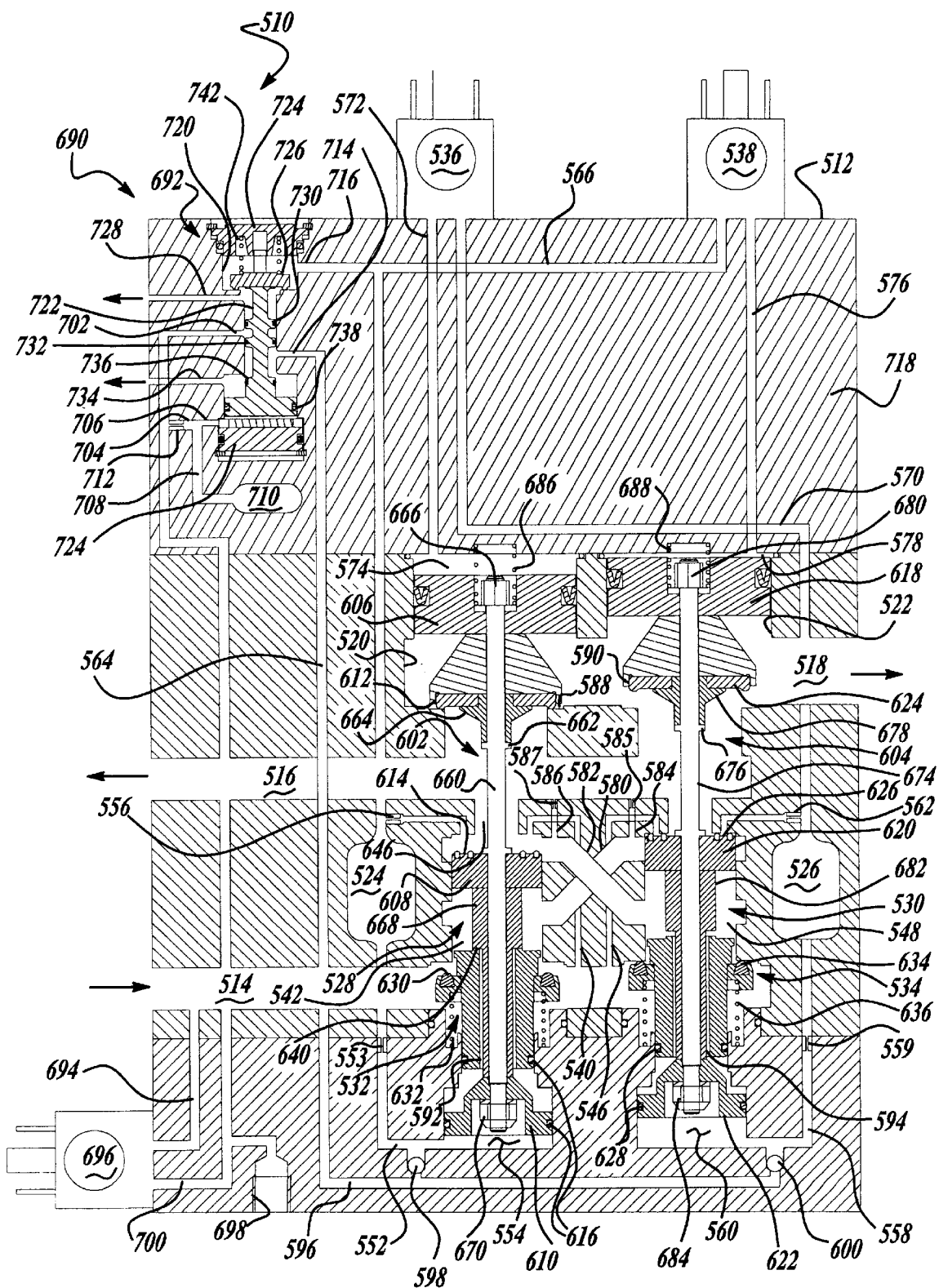
FIG. 19 is a cross-sectional view of the control valve shown in its abnormal position.

FIGS. 18 and 19 illustrate control valve system 510 in an abnormal position. In FIGS. 18 and 19, valve member 604 is located in its upward position while valve member 602 is located in its lower position. Both solenoid valves 536 and 538 are located in their deactuated position. Valve member 604 is located in its upward position similar to that shown in FIG. 15. Pressurized fluid from inlet passage 514 is supplied to passage 546 to passage 558 through annular passage 626 through restrictor 562 and into chamber 560 to bias valve member 604 upward as shown in FIG. 19 seating piston 620 against housing 12. Pressurized fluid also flows to reservoir 526 and from reservoir 526 to the inlet of solenoid valve 536 through passage 570. Outlet passage 516 is in communication with exhaust passage 518 due to valve seat 624 being biased upward opening port 590. Valve member 602 is located in its lower position which opens various passages to outlet passage 516 which, because the position of valve member 604, is open to exhaust 518. The upper portion of chamber 542 is open to exhaust through gap 646. Pressurized fluid from inlet passage 514 is bled to exhaust through passage 540 and through the upper portion of chamber 542 through gap 646, through outlet passage 516, through port 590 to exhaust passage 518. In addition, pressurized fluid from inlet passage 514 will bleed to exhaust 518 by entering the lower portion of chamber 542, flow through passage 580, through passage 584, through outlet passage 516, through port 590 and into exhaust passage 518. Pressurized fluid in passage 552 and thus chamber 554 is also bled to exhaust through restrictors 553 and 556 which removes the biasing being applied to valve member 602. A leak path also exists from inlet 514 to the lower portion of chamber 542 to the upper portion of chamber 542 via a gap between piston 608 and the walls of bore 520. From the upper portion of chamber 542, fluid pressure may escape as described above. Yet another leak path exists from the lower portion of chamber 542 through passage 580, from upper portion to lower portion of chamber 548, and through passage 582 into upper portion of chamber 542. From the upper portion of chamber 542, fluid pressure may escape as described above. In addition, fluid pressure in reservoir 524 is bled to exhaust through restrictor 556 removing the pressurized fluid being supplied to solenoid valve 538 through passage 566. The amount of time for chamber 554 and reservoir 524 to bleed to exhaust will depend upon the size of chamber 54, reservoir 524 and restrictors 553 and 556. With the release of pressurized air from chamber 574 above piston 606 and the presence of pressurized air within inlet passage 514 acting against the bottom of valve seat 630, valve spring 532 will move valve member 602 to an intermediate position where valve seat 630 is seated against housing 512 but piston 608 is not seated against housing 512. This condition is shown in FIGS. 10 and 11.

While the above description of FIGS. 18 and 19 have been described with valve member 602 being located in its intermediate, and locked out position and valve body 604 being located in its deactuated position, it is to be understood that a similar locked out position of control valve system 510 would occur if valve member 602 were located in its deactuated condition and valve member 604 were located in its intermediate and locked out condition.

Thus, control valve system 510 is a fully fluidically operating valve system which has the capability of sensing an abnormal condition and responding to this abnormal condition by switching to a locked out condition which then requires an individual to go through a resetting operation before control valve system 510 will again function. Control valve system 510 further prevents operation of the valve during a reset operation.

Figure 20:
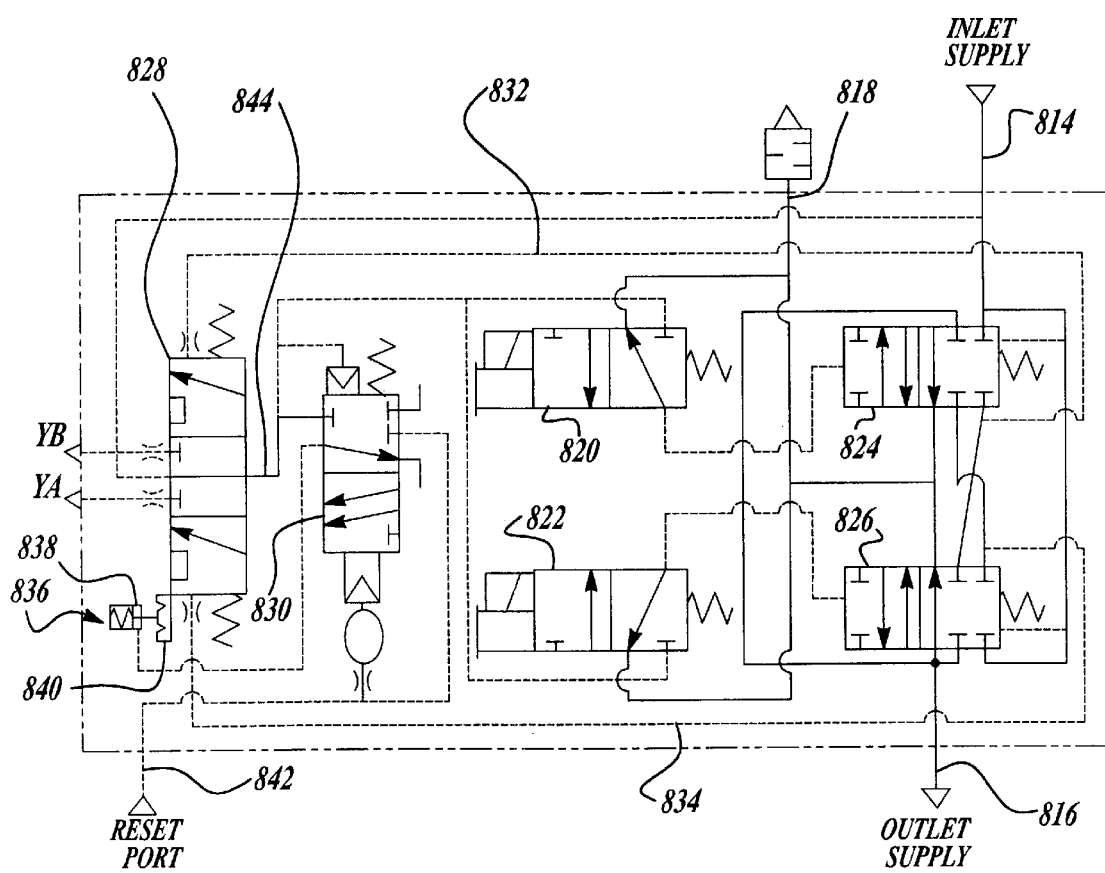
FIG. 20 is a schematic circuit diagram of the control valve system having an anti-tiedown circuit according to another embodiment of the present invention shown in its deactuated position.

The control valve systems 10 and 510 described above in FIGS. 1–19 are generally referred to as crossmirror valves because they are configured to include a monitoring feature integral to the design of the valve. These valves offer particular features to the customer. An alternative valve configuration may generally be referred to as a crossflow valve. A typical crossflow valve comprises a body and valve elements, but does not inherently include a monitoring circuit for detecting when the valve systems are in an abnormal configuration. Such a valve may be referred to as a double valve, and FIG. 20 illustrates a schematic circuit diagram for control valve system 810, which defines yet another embodiment of the present invention. With reference to FIG. 20, control valve system 810 includes an inlet supply 814, an outlet supply 816, and an exhaust 818. Solenoid valve 820 controls actuation of first valve member 824. Similarly, solenoid valve 822 controls actuation of second valve member 826. Solenoid valves 820 and 822 must be actuated within a predetermined time period, and respective first valve member 824 and second valve member 826 must actuate and deactuate within a predetermined time period in order to prevent transition of control valve system 810 to a locked out position. Control valve system 810 also includes a lockout spool 828 and anti-tiedown valve 830. It should be noted that solenoid valves 820 and 822 are analogous to respective solenoid valves 36, 38 and 536, 538, as described above. Similarly, it should be noted that main valve members 824, 826 are analogous to first valve members 28, 30 and 528, 530 described above. Similarly, anti-tiedown valve 830 is analogous to anti-tiedown valve 592 described above.

Lock out spool 828 is a four port, three position spool valve which monitors fluid pressure on fluid passages 832 and 834, which reflect the pressure output by main valve members 824, 826. When the pressures are generally equal, spool valve 828 assumes a centered position. When the pressure becomes unequal, lock out spool 828 shifts, thereby exhausting input pressure to port YA and exhausting control pressure applied to anti-tiedown valve 830 and solenoid valves 822, 824 to port YB. A lock out switch 836 includes a lockout pin 838. Lock out pin 838 is biased in the direction of a notched member 840 which moves in accordance with a displaceable portion of lockout spool 828. Notched member 840 includes a pair of notches, one of which lockout pin 838 engages as lockout member 840 shifts in accordance with the spool portion of lockout spool 828. Once in a locked out position, fluid pressure must be applied to reset port 842 in order to return lockout spool 828 to its center position by pressurizing lock out pin 838 away from notched member 840 thereby enabling lock out spool 828 to return to its center position, so long as the pressure inputs on fluid passages 832 and 834 are generally equal.

Anti-tiedown valve 830 operates similarly as described above in order to provide a path from fluid passage 844 to exhaust through anti-tiedown valve 830 during reset. In operation, applying fluid pressure to reset port 842 displaces anti-tiedown valve 830 to an actuated position. In the actuated position, anti-tiedown valve 830 provides a path to exhaust for fluid passage 844. Also when in an actuated position, anti-tiedown valve 830 provides a path from reset port 842 to reset pin 838. The reset pressure pressurizes a chamber which overcomes the biasing force of a spring that biases reset pin 838 towards notched member 840. During the reset operation, fluid pressure cannot be applied to either of solenoid valves 820, 822, and thus cannot be applied to respective main valve members 824, 826. This prevents application of inlet pressure on outlet supply 816. Once fluid pressure is removed from reset port 842, anti-tiedown valve 830 returns to its deactuated position, as described above with respect to FIGS. 10–19, enabling operation of main valve members 824, 826.

While the above detailed description describes the preferred embodiment of the present invention, it should be understood that the present invention is susceptible to modification, variation and alteration without deviating from the scope and fair meaning of the subjoined claims.

What is claimed is:

1. A control valve system comprising:
   a housing defining a reset port, an inlet, an outlet and an exhaust;
   a first passage extending between said inlet and said outlet;
   a second passage extending between said outlet and said exhaust;
   a first plurality of valves disposed within said first passage, each of said first plurality of valves being movable between a deactuated position where said first passage is closed and an actuated position where said first passage is open;
   a second plurality of valves disposed within said second passage, each of said second plurality of valves being movable between a deactuated position where said second passage is open and an actuated position where said second passage is closed;
   means for maintaining one of said first plurality of valves in said actuated position when one other of said first plurality of valves is in said deactuated position;
   a reset passage extending between said first passage and said reset port, each of said first plurality of valves being moved to said deactuated position when a pressurized fluid is supplied to said reset passage; and
   an anti-tiedown circuit, said anti-tiedown circuit preventing said one of first plurality of valves from being moved to said actuated position while the pressurized fluid is supplied to said reset port.

2. The control valve system according to claim 1 wherein said anti-tie-down means comprises an anti-tiedown valve disposed in said reset passage, said anti-tiedown valve preventing pressurized fluid from being supplied to said reset passage when deactuated and enabling pressurized fluid to be supplied to said reset passage when actuated.

3. The control valve system according to claim 1 wherein said anti-tiedown circuit further comprises:
   an anti-tiedown inlet, an anti-tiedown outlet, an anti-tiedown vent, and an anti-tiedown exhaust;
   a pressure passage extending between said anti-tiedown inlet and said anti-tiedown outlet;
   a vent passage extending between said anti-tiedown vent and said anti-tiedown exhaust; and
   an anti-tiedown valve moveable between a deactuated position in which said vent passage and said pressure passages are closed and an actuated position in which said vent passages and said pressure passages are open.

4. The control valve system according to claim 3 wherein said anti-tiedown circuit comprises a biasing member, said biasing member biasing said anti-tiedown valve to a deactuated position.

5. The control valve system according to claim 1 wherein, said first plurality of valves comprises a first valve assembly disposed within said first passage and said second plurality of valves comprises a second valve assembly disposed within said second passage.

6. The control valve system according to claim 5 wherein, said first plurality of valves comprises a third valve assembly disposed between said inlet and said first valve assembly.

7. The control valve system according to claim 6 wherein, said first plurality of valves comprises a fourth valve assembly disposed between said inlet and said first valve assembly.

8. The control valve system according to claim 1 wherein, said first a plurality of valves comprises a first and a second valve assembly disposed within said first passage and said second plurality of valves comprises a third and a fourth valve assembly disposed within said second passage.

9. The control valve system according to claim 8 wherein, said first plurality of valves comprises a fifth valve assembly disposed between said inlet and said first valve assembly and said second plurality of valves comprises a sixth valve assembly disposed between said inlet and said second valve assembly.

10. The control valve system according to claim 9 wherein, said first plurality of valves comprises a seventh valve assembly disposed between said inlet and said first valve assembly and said second plurality of valves comprises an eighth valve assembly disposed between said inlet and said second valve assembly.

11. A circuit for operating a control valve system comprising:
    a reset port, an inlet, an outlet, and an exhaust;
    a first passage extending between said outlet and said exhaust;
    a second passage extending between said inlet and said outlet;
    a first main valve moveable between a deactuated position where said first passage is open and an actuated position;
    a second main valve moveable between a deactuated position where said first passage is open and an actuated position, said second passage being open when said first and second main valves are in an actuated position, wherein said first and second main valves move between said actuated and deactuated positions within a predetermined time period;
    a lockout circuit, said lockout circuit preventing actuation of one of said first and second main valves if said first and second main valves do not actuate within said predetermined time period, wherein at least one of said main valves assume a locked out position;
    a reset circuit, said reset circuit displacing said at least one main valve from said locked out position to said deactuated position; and
    an anti-tiedown circuit, said anti-tiedown circuit preventing displacement of at least one of said main valves to an actuated position when said reset circuit is operative.

12. The circuit of claim 11 comprising:
a first pilot valve for operating said first main valve; and
a second pilot valve for operating said second main valve.

13. The circuit of claim 11 comprising an anti-tie-down valve disposed in said reset circuit, said anti-tiedown valve preventing pressurized fluid from being supplied to said reset circuit when deactuated and enabling pressurized fluid to be supplied to said reset circuit when actuated.

14. The circuit according to claim 11 wherein said anti-tiedown circuit further comprises:
- an anti-tiedown inlet, an anti-tiedown outlet, an anti-tiedown vent, and an anti-tiedown exhaust;
- a pressure passage extending between said anti-tiedown inlet and said anti-tiedown outlet;
- a vent passage extending between said anti-tiedown vent and said anti-tiedown exhaust; and
- an anti-tiedown valve moveable between a deactuated position in which said vent passage and said pressure passages are closed and an actuated position in which said vent passages and said pressure passages are open.

15. The circuit according to claim 14 wherein said anti-tiedown circuit comprises a biasing member, said biasing member biasing said anti-tiedown valve to a deactuated position.

16. A control valve system comprising:
- a housing defining a reset port, an inlet, an outlet and an exhaust;
- a first passage extending between said inlet and said outlet;
- a second passage extending between said outlet and said exhaust;
- a first valve disposed within said first passage, said first valve being movable between a deactuated position where said first passage is closed and an actuated position where said first passage is open;
- a second valve disposed within said second passage, said second valve being movable between a deactuated position where said second passage is open and an actuated position where said second passage is closed;
- a first biasing member for biasing said first and second valves into said deactuated position;
- a third valve disposed within said first passage, said third valve being movable between a deactuated position where said first passage is closed and an actuated position where said first passage is open;
- a fourth valve disposed within said second passage, said fourth valve being movable between a deactuated position where said second passage is open and an actuated position where said second passage is closed;
- a second biasing member for biasing said third and fourth valves into said deactuated position;
- a fifth valve disposed between said inlet and said third valve, said fifth valve being movable between a deactuated position where said inlet does not communicate with said third valve through said fifth valve and an actuated position where said inlet communicates with said third valve through said fifth valve;
- a third biasing member for biasing said fifth valve into said deactuated position;
- a sixth valve disposed between said inlet and said first valve, said sixth valve being movable between a deactuated position where said inlet does not communicate with said first valve through said sixth valve and an actuated position where said inlet communicates with said first valve through said sixth valve;
- a fourth biasing member of biasing said sixth valve into said deactuated position;
- a seventh valve disposed between said inlet and said first valve, said seventh valve movable between a deactuated position where said inlet does not communicate with said first valve through said seventh valve and an actuated position where said inlet communicates with said first valve through said seventh valve;
- an eighth valve disposed between said inlet and said third valve, said eighth valve, being movable between a deactuated position where said inlet does not communicate with said third valve through said eighth valve and an actuated position where said inlet communicates with said second valve through said eighth valve;
- means for prohibiting movement of at least one of said valves when a first portion of said valves are in said actuated position and a second portion of said valves are in said deactuated position; and
- a reset passage extending between said first and second passages and said reset port, each of said first, second, third, fourth, fifth and sixth valves being moved to said deactuated position when a pressurized fluid is supplied to said reset passage; and
- an anti-tiedown circuit, said anti-tiedown circuit preventing each of said first, second, third, fourth, fifth and sixth valves from being moved from the deactuated position to the actuated position while the pressurized fluid is supplied to the reset port.

* * * * *